United States Patent
Carpenter et al.

(10) Patent No.: US 10,534,758 B1
(45) Date of Patent: Jan. 14, 2020

(54) FILE SYSTEM CACHE TIERS

(71) Applicant: Qumulo, Inc., Seattle, WA (US)

(72) Inventors: Edward Carpenter, Seattle, WA (US); Thomas Gregory Rothschilds, Seattle, WA (US); Peter J. Godman, Seattle, WA (US); Duncan Robert Fairbanks, Seattle, WA (US); Patrick Jakubowski, Seattle, WA (US); Zexuan Wang, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/228,716

(22) Filed: Dec. 20, 2018

(51) Int. Cl.

| | |
|---|---|
| *G06F 16/185* | (2019.01) |
| *G06F 12/122* | (2016.01) |
| *G06F 12/0897* | (2016.01) |
| *G06F 16/172* | (2019.01) |
| *G06F 16/182* | (2019.01) |
| *G06F 11/30* | (2006.01) |
| *G06F 3/06* | (2006.01) |
| *G06F 16/11* | (2019.01) |

(52) U.S. Cl.
CPC .......... *G06F 16/185* (2019.01); *G06F 3/0647* (2013.01); *G06F 3/0653* (2013.01); *G06F 11/3037* (2013.01); *G06F 12/0897* (2013.01); *G06F 12/122* (2013.01); *G06F 16/119* (2019.01); *G06F 16/172* (2019.01); *G06F 16/182* (2019.01); *G06F 2212/1021* (2013.01); *G06F 2212/1024* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 9,785,377 B2 * | 10/2017 | Shin | G06F 3/0653 |
| 2018/0314423 A1 * | 11/2018 | Gong | G06F 3/0647 |

* cited by examiner

*Primary Examiner* — Charles J Choi
(74) *Attorney, Agent, or Firm* — John W. Branch; Lowe Graham Jones PLLC

(57) ABSTRACT

Embodiments are directed to a file system engine that provides a file system that includes a plurality of blocks on a file storage tier with portion of the blocks associated with a cache storage tier. A cache engine provides heat extents that include a heat score and a run length value such that the heat extents are represent activities associated with the blocks. Heat extents associated with file system activities are determined based on a position of the blocks that corresponds with the run length values of the heat extents and sectors on the file storage tier. Heat scores associated with the heat extents may be modified based on the activities and distribution models to conform the heat extents with the distribution models. Blocks associated with heat scores that are less than a threshold value provided by the distribution models may be disassociated from the cache storage tier.

30 Claims, 13 Drawing Sheets

*Heat Extent Groups*

FILE SYSTEM CACHE TIERS

TECHNICAL FIELD

The present invention relates generally to file systems, and more particularly, but not exclusively, to file system cache management in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Conventionally, some distributed file systems implement various caching schemes to help improve performance. However, as file systems increase in size or complexity, caching or cache management may increasingly become a burdensome in terms of performance or storage requirements. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF THE VARIOUS EMBODIMENTS

Figure 1:
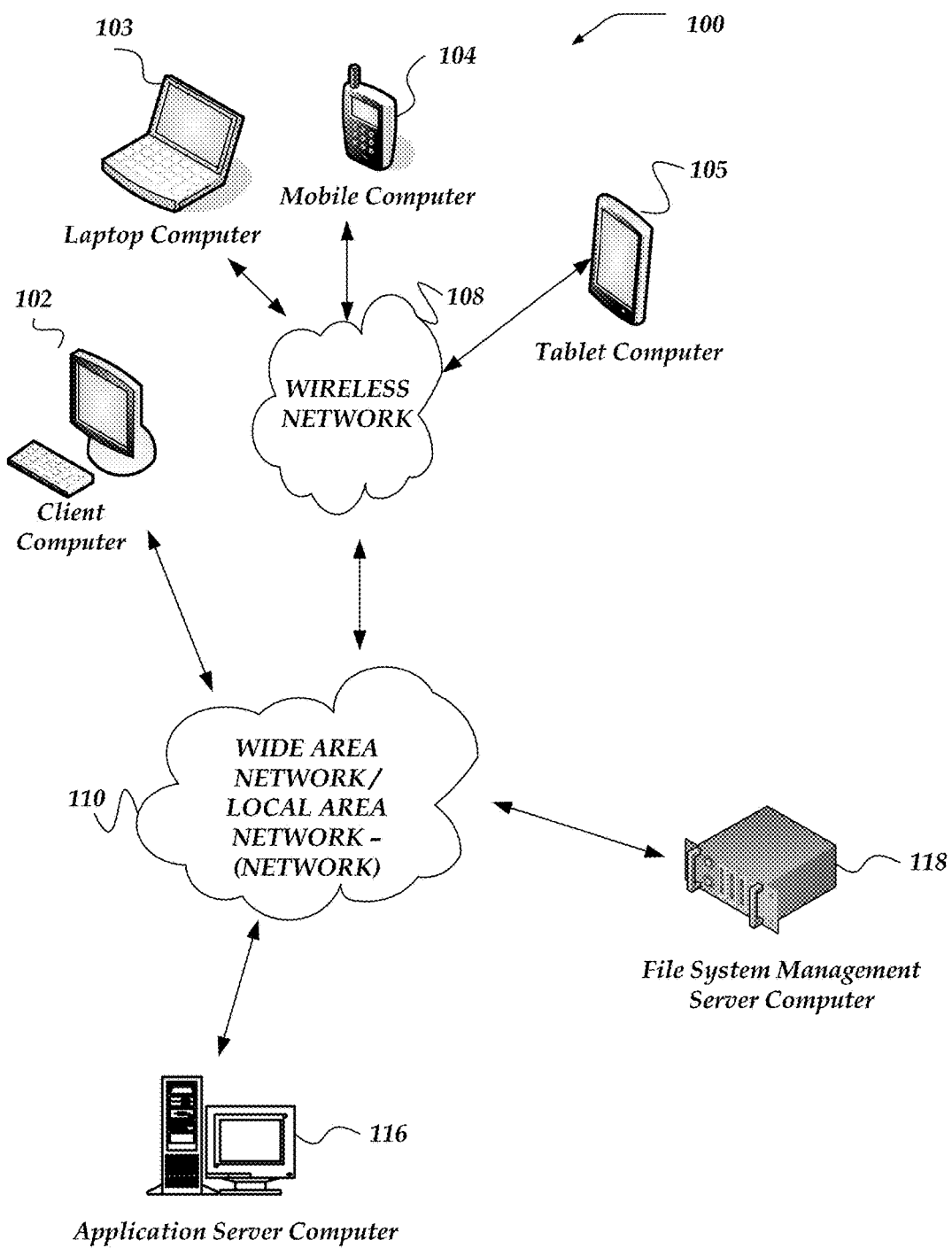
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the terms "block," or "file system object block" refer to the file system objects that comprise a file system object. For example, small sized file system objects, such as, directory objects or small files may be comprised of a single block. Whereas, larger file system objects, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), or the like. However, file system objects may be of various sizes, comprised of the number of blocks necessary to represent or contain the entire file system object.

As used herein the term "heat score" refers to a value that represents the amount of activity directed to a block or file system object. Generally, storing blocks associated with higher heat scores in higher performing cache tier is likely to improve performance or responsiveness of a file system. Low heat scores indicate that block are not accessed as often as blocks associated with higher heat scores. Note, heat scores are one factor of many that may be considered to determine if a block should be promoted or demoted from a storage tier or cache tier.

As used herein the term "heat extent" refers to a data structure that is used to store the heat state associated with one or more blocks. Heat extents may comprise various properties or attributes, include, a heat score, location indicator, dirty indicator, run length value, or the like. Heat extents may be used to represent heat state for one or more blocks in a file system.

As used herein the terms "heat extent group," "heat group," or "group" refer to a data structure that includes one or more heat extents that are grouped together, heat extents in a group are ordered to represent the positional order of the blocks they represent.

As used herein the term "heat extent group summary," "heat summary" refer to data structures that include various aggregate metrics or statistics associated with a heat extent group. Heat extent group summaries provide light weight data sketches that enable rapid or efficient evaluation of the characteristics of the heat extent that comprise of heat extent group.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a file system engine may be instantiated to provide a file system that includes a plurality of blocks on a file storage tier such that a portion of the plurality of blocks may be associated with a cache storage tier.

In one or more of the various embodiments, a cache engine may be instantiated to provide one or more heat extents that include a heat score and a run length value such that the one or more heat extents may be stateful representations of one or more activities associated with one or more of the plurality blocks. In one or more of the various embodiments, providing the one or more heat extents, may include determining a location of the one or more blocks associated with the one or more heat extents based on a location attribute that may be included in the one or more heat extents such that the location may one of the cache storage tier or the file storage tier.

In one or more of the various embodiments, the cache engine may be arranged to monitor the one or more activities associated with the one or more blocks. In some embodiments, in response to an activity being a write activity, the cache engine may be arranged to determine a first heat extent that may be associated with the one or more blocks associated with the write activity based on a starting position of the write activity and the run length value of the one or more heat extents. In one or more of the various embodiments, the cache engine may be arranged to truncate the run length of the first heat extent based on the starting position of the write activity. And, in one or more of the various embodiments, the cache engine may be arranged to provide a second heat extent that may be associated with the one or more blocks associated with the write activity such that a run length of the second heat extent may be based on a remainder of the run length of the first extent and a run length threshold value.

In one or more of the various embodiments, the cache engine may be arranged to determine the one or more heat extents associated with the one or more activities based on a position of the one or more blocks such that the position corresponds with the run length values of the one or more heat extents and one or more sectors on the file storage tier that may be associated with the one or more blocks.

In one or more of the various embodiments, the cache engine may be arranged to modify the one or more heat scores associated with the one or more heat extents based on the one or more activities and one or more distribution models such that the modification includes decreasing the one or more heat scores to conform the one or more heat extents with the one or more distribution models.

In one or more of the various embodiments, the cache engine may be arranged to disassociate the one or more blocks from the cache storage tier that may be associated with heat scores that are less than a threshold value provided by the one or more distribution models.

In one or more of the various embodiments, the cache engine may be arranged to associate the one or more heat extents with one or more groups based on a position of the one or more blocks on the file storage tier. In one or more of the various embodiments, the cache engine may be arranged to provide summary information associated with the one or more groups. And, in one or more of the various embodiments, the cache engine may be arranged to determine the one or more heat extents for modification based on the summary information.

In one or more of the various embodiments, the cache engine may be arranged to determine one or more adjacent heat extents. In one or more of the various embodiments, the cache engine may be arranged to determine two or more combinable heat extents of the one or more adjacent heat extents such that the two or more combinable heat extents have a same heat score, and such that a sum of the run length values for the two or more combinable heat extents are less than a threshold value. And, in one or more of the various embodiments, the cache engine may be arranged to combine the two or more combinable heat extents.

In one or more of the various embodiments, the cache engine may be arranged to determine a number of blocks that may be associated with each heat extent based on the run length value associated with each heat extent such that the number of blocks associated with each heat extent corresponds with its run length value.

In one or more of the various embodiments, the cache engine may be arranged to associate the one or more heat extents with one or more groups based on the position of the one or more blocks on the file storage tier. In one or more of the various embodiments, the cache engine may be arranged to determine the one or more groups that may require a rebalancing of heat scores based on the one or more distribution models. And, in one or more of the various embodiments, the cache engine may be arranged to rebalance the heat scores that may be associated with the one or more heat extents associated with the one or more determined groups to conform to the one or more distribution models.

In one or more of the various embodiments, the cache engine may be arranged to modify the one or more heat scores associated with the one or more heat extents based on the one or more activities and one or more distribution models such that the modification includes increasing the one or more heat scores to conform the one or more heat extents with the one or more distribution models; associating one or more blocks with the file storage tier that are associated with heat scores that exceed a threshold value provided by the one or more distribution models; and copying contents of the one or more associated blocks to the cache storage tier.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or file system management server computer 118 are described in more detail below in conjunction with FIG. 3. Although FIG. 1 illustrates application server computer 116 and file system management server computer 118 each as a single computer, the innovations or embodiments are not so limited. For example, one or more functions of application server computer 116, file system management server computer 118, or the like, may be distributed across one or more distinct network computers. Moreover, in one or more embodiments, file system management server computer 118 may be implemented using a plurality of network computers. Further, in one or more of the various embodiments, application server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
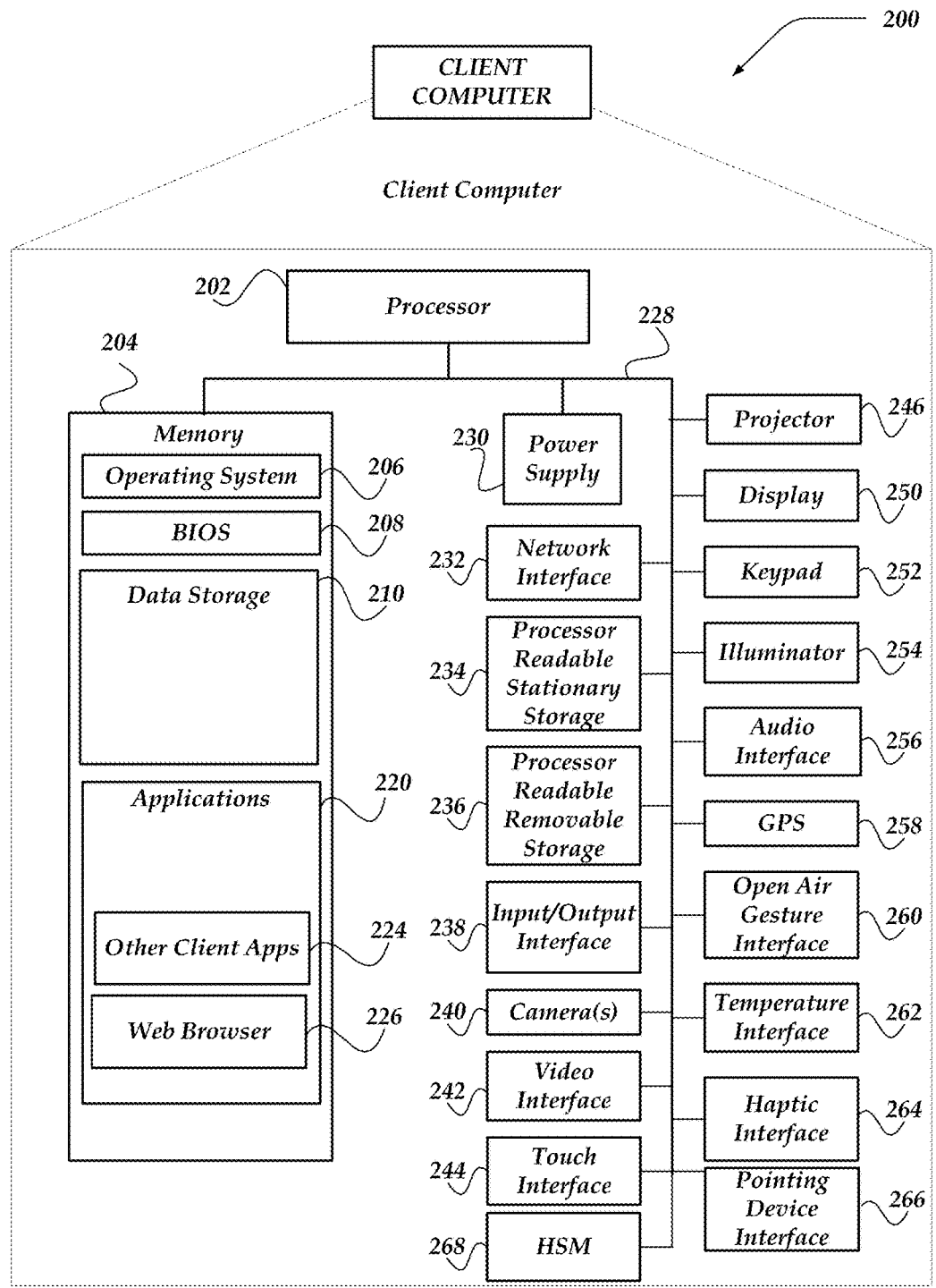
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
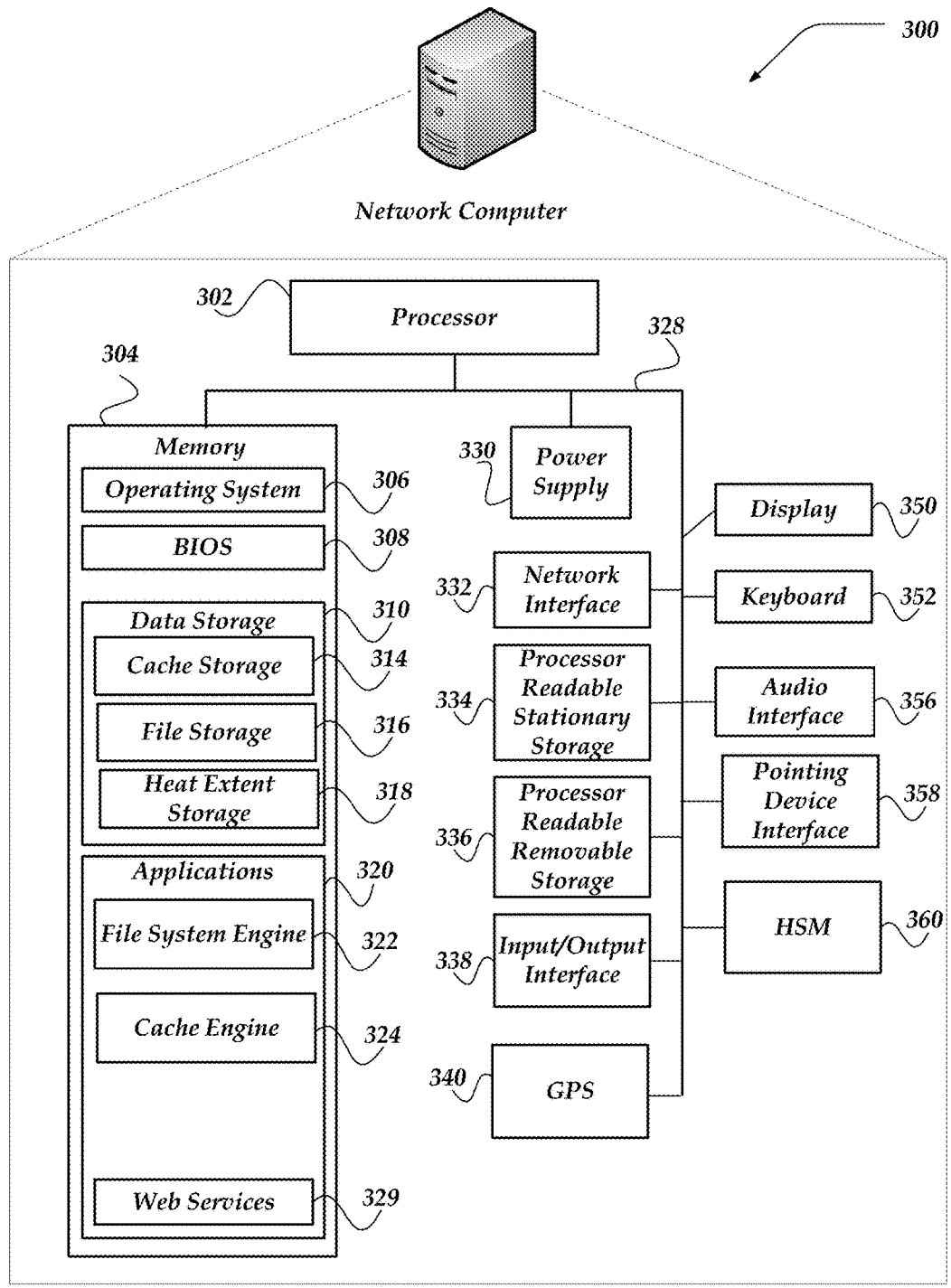
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or file system management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, cache engine 324, web services 329, or the like, may be arranged to employ geo-location information to select one or more localization features, such as, time zones, languages, currencies, currency formatting, calendar formatting, or the like. Localization features may be used in file system meta-data, file system objects, file systems, permissions, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, cache storage 314, file storage 316, heat extent storage 318, or the like. Cache storage 314 or file storage 316 may store files, documents, versions, properties, permissions information, file meta-data, data structures, or the like, that represent one or more portions of a distributed file system. In some embodiments, various storable objects (e.g., file system objects) may be divided into one or more blocks or pages that are stored or indexed in cache storage 314 or file storage 316. In some embodiments, cache storage 314 may comprise one or more solid state drives (SSDs) and file storage 316 may comprise one or more hard drives (HDDs).

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, cache engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, cache engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, cache engine 324, web services 329, or the like, may be provisioned and de-commissioned automatically.

Also, in one or more of the various embodiments, file system engine 322, cache engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
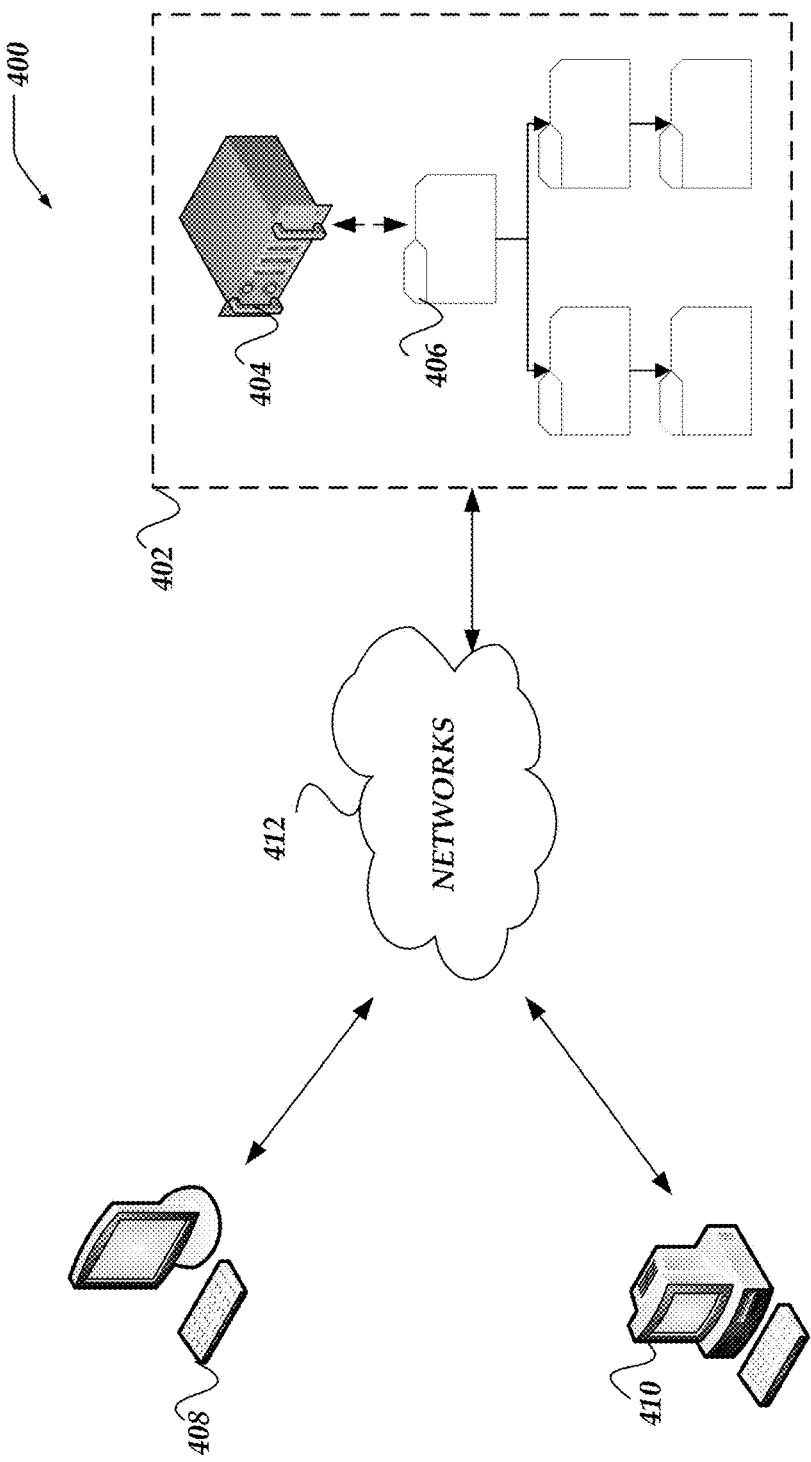
FIG. 4 illustrates a logical architecture of a system for file system cache tiers in accordance with one or more of the various embodiments.

FIG. 4 illustrates a logical architecture of system 400 for file system cache tiers in accordance with one or more of the various embodiments. In one or more of the various embodiments, file systems, such as, file system 402 may be arranged to be communicatively coupled to one or more networks, such as, networks 412. Accordingly, in one or more of the various embodiments, one or more clients, such as, client computer 408 and client computer 410 may be arranged to access file system 402 over networks 412. In some embodiments, clients of file system 402 may include users, services, programs, computers, devices, or the like, that may be enabled to perform one or more file system operations, such as, creating, reading, updating, or deleting data (e.g., file system objects) that may be stored in file system 402. In some embodiments, file system 402 may comprise one or more file system management computers, such as file system management computer 404. Also, in one or more of the various embodiments, file systems, such as file system 402 may include one or more file system objects, such as file system object 406 that may represent the various objects or entities that may be in file system 402. In some embodiments, file system objects may include, files, documents, directories, folders, change records, file system journals, backups, snapshots, replication information, versions, branches, blocks, pages, or the like. In some embodiments, primitive file system objects, such as, blocks or pages, may be used to compose more complex file system objects.

In one or more of the various embodiments, the implementation details that enable file system 402 to operate may be hidden from clients such that they may be arranged to use file system 402 the same way they use other file systems, including local file systems. Accordingly, in one or more of the various embodiments, clients may be unaware that they are using a file system that supports one or more cache tiers because file system engines or cache engines may be arranged to mimic the interface or behavior of native file systems used by the clients.

Also, while file system 402 is illustrated as using one file system management computer with one set of file system objects, the innovations described herein are not so limited. Innovations herein contemplate file systems that include one or more file system management computers or one or more file system object data stores. In some embodiments, file system object stores (e.g., file storage 316) may be located remotely from one or more file system management computers. Also, a logical file system object store or file system may be spread across two or more cloud computing environments, storage clusters, one or more on-premises servers, or the like, or combination thereof.

Figure 5:
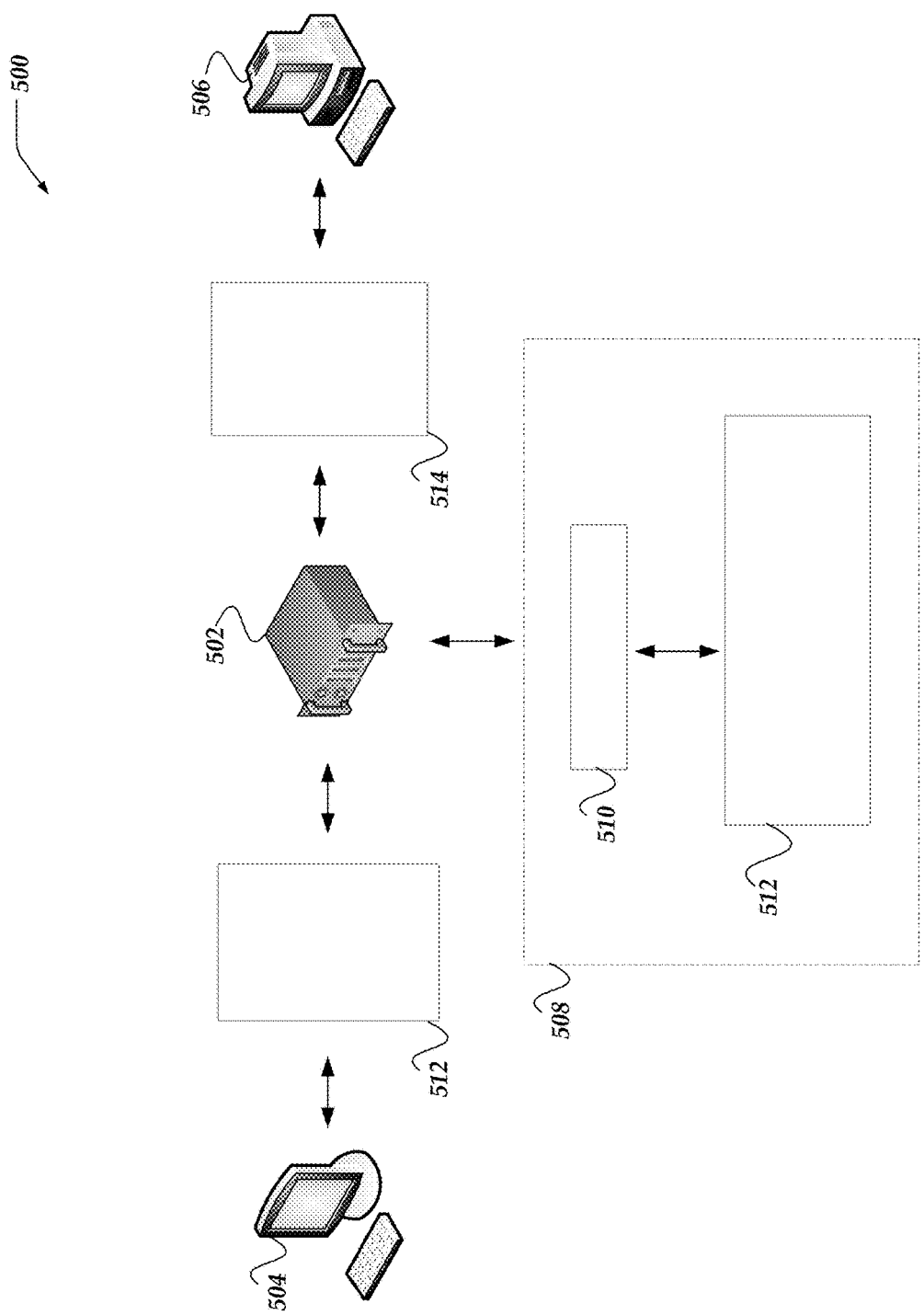
FIG. 5 illustrates a logical architecture of a file system that includes cache tiers in accordance with one or more of the various embodiments.

FIG. 5 illustrates a logical architecture of file system 500 that includes cache tiers in accordance with one or more of the various embodiments. As described above, file systems may include one or more file system management server computers, such as, file system management server computer 502. Also, in one or more of the various embodiments, one or more client computers, such as, client computer 504 and client computer 506 may access (e.g., read, write, or delete) one or more file system objects, such as, file system object 512 or file system object 514.

In one or more of the various embodiments, file system management server computer may be arranged to store or manage of the storage of file system objects. In some embodiments, data storage 508 may represent one or more data storage systems or devices that may be used to store file system objects. In some embodiments, data storage 508 may include one or more cache storage tiers, such as, cache storage tier 510. Also, in some embodiments, data storage 508 may include one or more file storage tiers, such as file storage tier 512. In some embodiments, cache storage tier 510 may be comprised of storage components or resources that for one or more reasons (e.g., expense, or the like) may be considered scarcer than the storage components or resources comprising file storage tier 512. For example, in some embodiments, cache storage tier 510 may be comprised of one or more SSDs while file storage tier 512 may be comprised of one or more HDDs.

In one or more of the various embodiments, file system management server computer may be arranged to manage the distribution of file objects onto cache storage tier 510 or file storage tier 512. In some embodiments, this may include managing the demotion of file objects from cache storage to file storage or the promotion of file objects from file storage to cache storage.

Accordingly, in one or more of the various embodiments, file system management server computer may include one or more cache engines that may be instantiated to perform one or more actions to manage the promotion or demotion of file system objects to or from cache storage. In one or more of the various embodiments, cache engines may be arranged to employ one or more databases of heat extents that may be used for evaluating how to allocate cache resources of the file system.

Note, for brevity and clarity, data storage 508 is illustrated as having one cache storage tier and one file storage tier, one of ordinary skill in the art will appreciate that these innovations are not so limited. For example, in some embodiments, data storage for a file system may include two or more cache storage tiers or two or more file storage tiers. Accordingly, the innovations disclosed herein may be applied to systems having one or more cache storage tiers or one or more file storage tiers.

Figure 6:
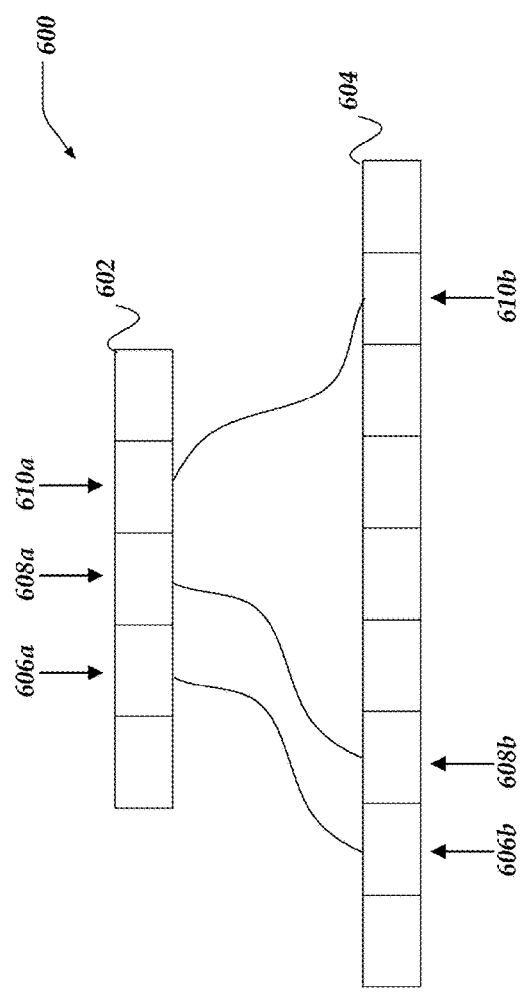
FIG. 6 illustrates data storage that includes cache storage and file storage in accordance with one or more of the various embodiments.

FIG. 6 illustrates data storage 600 that includes cache storage and file storage in accordance with one or more of the various embodiments. In one or more of the various embodiments, data storage 600 may comprise cache storage tier 602 and file storage tier 604. In one or more of the various embodiments, cache storage tier 602 may be logically comprised of a plurality of sectors, such as, sector 606a, sector 608a, sector 610a, or the like. Each sector may be arranged to have a specified size based on various specifications of the file system or one or more of its hardware or software components. For example, a file system may be arranged to use sectors that can store 4 KB of data. In some embodiments, the smallest file system object of a file system (e.g., blocks or pages) may be arranged to match the sector size of storage components used by a file system. In other embodiments, the block size or page size used by a file system may be independent of the sector size and enforced by one or more underlying software or hardware systems comprising the file system. In the example described in herein, for brevity and clarity, each sector may store one block. Though in some embodiments, a file system block may have a different size than a storage sector. In such cases, a sector, such as, sector 606a may be considered a logical sector that stores one file system block. In many embodiments, file system block size may be selected to match or align with sector sizes enforced or expected by one or more storage components comprising a file system.

In one or more of the various embodiments, file storage tier 604 also may be arranged to include a plurality of sectors, such as, 606b, 608b, 610b, or the like. In some embodiments, sectors on file storage tier 604 may be arranged to be the same size as sectors on cache storage tier 602. Further, in one or more of the various embodiments, file storage tier 604 may be considered to have more sectors than cache storage tier 602, though that is not a strict requirement. In some embodiments, physical or native sector sizes of cache storage tier 602 or file storage tier 604 may be different from each other. In such circumstances, a file system engine, such as, file system engine 314 may be arranged to provide logical sectors that have the same size as the file system blocks by mapping the logical sectors to one or more physical or native sectors one the storage components.

In one or more of the various embodiments, cache storage tier 602 may be arranged to the have capacity to hold fewer sectors or blocks than file storage tier 604. In some cases, cache storage may be comprised of data storage hardware that have one or more advantageous performance characteristics as compared the storage hardware comprising file storage tier 604. But, in some embodiments, cache storage may have one or more disadvantageous characteristics as well. Accordingly, in one or more of the various embodiments, selecting the amount of cache storage is based on one or more engineering trade-offs. For example, typically, storage capacity for cache storage may be more expensive that storage capacity in file storage. However, the cache storage may have performance characteristics such as, faster access, lower latency, reduced seek-time, faster reads, faster writes, or the like. For example, in some embodiments, cache storage tier 602 may be comprised of SSD storage while file storage tier 604 may be comprised of HDD storage. Accordingly, selecting a balance of cache storage to file storage may depend on the requirements of a given file system or its expected use cases. However, the innovations disclosed herein are applicable all cache storage versus file storage configurations or applications. Likewise, while most examples described herein are limited to one cache storage tier and one file storage tier, one of ordinary skill in the art will appreciate that these innovations anticipate supporting different arrangements that have more than one cache storage tier or more than one file storage tier.

In one or more of the various embodiments, blocks stored in cache storage correspond to blocks in file storage. For example, here the block stored in sector 606a of cache storage tier 602 corresponds to the block stored in sector 606b of file storage tier 604. During normal operations, the data stored in the two sectors may be different or out-of-sync, but they may represent the same logical block that comprises the same file system object. Likewise, in this example, a block stored in sector 608a corresponds to the block located at sector 608b and another block stored in sector 610a corresponds to the block stored in block 610b. In one or more of the various embodiments, the file system engine or cache engine may be arranged to automatically map the location or address space of the blocks to determine if a block should be accessed (e.g., read, write, modified, or the like) from cache storage or file storage. Generally, in one or more of the various embodiments, if a block is in cache storage, the version of block stored in cache storage will be used or otherwise considered the most recent version of the data being accessed.

However, in one or more of the various embodiments, cache storage may be a limited resource with a storage capacity far less than its corresponding file storage. Accordingly, in some embodiments, for caching to be effective there must be systems to move (demote) block from the cache storage to enable other blocks from the file storage to be promoted to cache storage. Conventionally, file systems that support caching provide facilities for managing the cache storage to determine if blocks from file storage should be promoted to cache storage. Likewise, in some embodiments, such facilities may be required to identify which blocks on cache storage should be demoted from cache storage. Naïve solutions, such as, first-in-first-out (FIFO), last-in-first-out (LIFO), or the like, may provide suboptimal performance because they may be unable to adapt to or account for usage patterns, user behavior, application requirements, or the like.

In one or more of the various embodiments, to account for usage patterns, user behavior, application requirements, or the like, more sophisticated cache management strategies may be employed. However, some of these management strategies often require indexing or record keeping that requires its own storage and processing time. Accordingly, in some embodiments, as the size of file systems increase, the resources (e.g., storage, processing, or the like) required to effectively manage the cache storage increase as well. Thus, for very large distributed file systems the resources required for conventional cache management may be very expensive to maintain.

Accordingly, in one or more of the various embodiments, a cache engine may be arranged to perform actions to manage cache storage using heat extents, heat extent groups, or the like, that improve performance or cost by providing a platform for sophisticated cache management that may adapt to application/usage/behavior while reducing the storage requirements for the cache management system itself.

In one or more of the various embodiments, a cache engine, such as cache engine 324, may be arranged to compute and track heat scores for blocks in cache storage or file storage. Accordingly, in one or more of the various embodiments, the heat scores for blocks may be used in part for determining if a block should be promoted to cache storage from file storage or demoted from cache storage to file storage.

In one or more of the various embodiments, cache engines may be arranged to employ one or more data structures, such as heat extents, heat extent groups, or the like, to track heat scores and other cache management information for blocks in the file system. In some embodiments, the cache engine may be arranged to maintain the state (heat state) of heat extents. Also, in some embodiments, cache engines may perform one or more operations that employ the information included in the heat extents to determine if blocks should be promoted or demoted.

Heat extents and heat extent groups are described in more detail below, but briefly, heat extents are data structures that include information, such as: heat scores that represent the amount of activity associated with blocks; location information that indicates if blocks are in cache storage or file storage; dirty flags for indicating if block contents at one location has been modified; or the like. Likewise, heat extent groups are data structures that represent ordered collections heat extents. Heat extent groups are also associated with heat summaries that summarize or aggregate one or more characteristics of the heat extents included in a heat extent group.

Figure 7A:
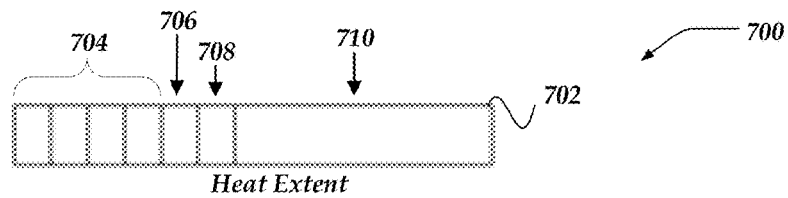
FIG. 7A illustrates a logical schematic of a heat extent that is in accordance with one or more of the various embodiments.
Figure 7B:
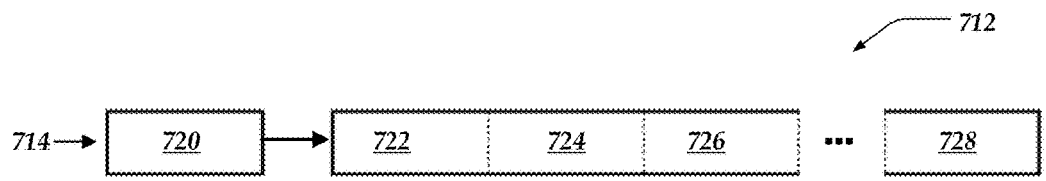
FIG. 7B illustrates a logical schematic of a heat extent groups in accordance with one or more of the various embodiments.
Figure 7C:
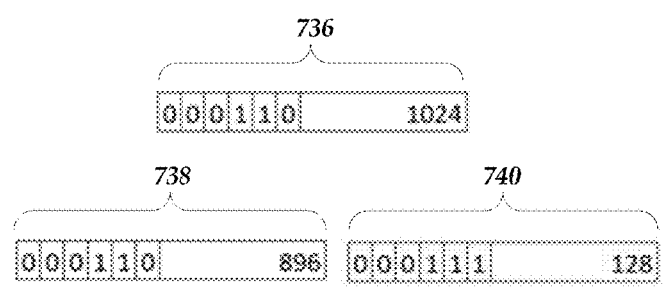
FIG. 7C illustrates a logical representation for splitting or combining heat extents in accordance with one or more of the various embodiments.

FIGS. 7A-7C illustrates logical schematics of heat extents, heat extent groups, as well as, as heat extent splitting in accordance with one or more of the various embodiments.

FIG. 7A illustrates a logical schematic of heat extent 702 that is in accordance with one or more of the various embodiments. In one or more of the various embodiments, heat extents may be arranged to include several fields, such as, fields 704 for storing the heat score that is associated with the extent, field 706 for indicating location of the represented block, field 708 for indicating if the blocks are dirty, and field 710 for indicating the run-length of the heat extent, or the like.

In one or more of the various embodiments, fields 704 may be sized to provide a desired range of heat scores. In this example, fields 704 represents 4-bits that enables heat scores to range from 0 to 15. In some embodiments, heat extents may be arranged to represent different heat ranges, such as using three bits to provide a heat score range of 0-7. The selection of heat score range may depend on the amount of granularity that may be desired for cache management in a given file system balanced against the desired size or desired byte alignment of heat extents for a file system.

In one or more of the various embodiments, in this example, field 706 is a one bit field for indicating if the one or more blocks represented by the heat extent are on cache storage or file storage. For example, if field 706 is set, the blocks may be considered to be on cache storage. And, if field 706 is not set, the blocks may be considered to be on file storage. In some embodiments, the location flag (field 706) indicates if the file system should access block contents from cache storage or file storage. In practice there may be contents of a block in both cache storage and file storage, but the location flag indicates if the heat extent applies to a block contents on cache storage or block contents on file storage.

In one or more of the various embodiments, in this example, field 708 is a dirty flag. In one or more of the various embodiments, if the dirty flag is set, one or more of the blocks associated with the heat extent may have been changed such that the block contents may not be the same on one or more other storage tiers. For example, if the heat extent is associated with cache storage (field 706 is set) and the dirty flag (field 708) is set, the content of one or more blocks associated with the heat extent may have been modified on cache storage and may be different than the corresponding block content on file storage.

In one or more of the various embodiments, as described above, blocks may be the smallest logical file system object in a file system. Accordingly, larger file system objects (e.g., documents or files) may be comprised of many blocks that are read, written or updated as groups or collections. For example, a document may correspond to many blocks. Accordingly, file system operations directed to the document may affect many blocks the same way. Thus, in some embodiments, a single heat extent may be arranged to represent the heat state for many similarly situated blocks. For example, if a document is comprised of 4096 (4K) blocks, each file system operation on the document may equally impact the heat state of the blocks comprising document. Accordingly, in some embodiments, one heat extent may be used to represent the heat state for many blocks with the expectation that there may be long sequences of blocks that may be affected by the same operations.

Accordingly, in one or more of the various embodiments, field 710 is used to store a run length value that indicates how many blocks in sequential order that a heat extent represents. For example if a heat extent has a heat score of 7 and a run length of 1024, this indicates that 1024 blocks in a sequence have a heat score of 7. In one or more of the various embodiments, the maximum run length of a heat extent may depend on the overall size the heat extent data structures. In the examples here, a 16-bit long heat extent that has a heat score range of 0-15 would have 10-bits reserved for representing run length of up to 1024 blocks. In some embodiments, each run length increment may be arranged to represent one or more blocks. Similarly, in one or more of the various embodiments, there may be a minimum run length used as an offset value. For example, if the minimum run length is one block and the run length value is ten, the actual run length represented by the heat extent is eleven blocks. Also, for example, if the run length step value is ten, a run length value of 64 in a heat extent may represent an actual run length of 640 blocks.

In one or more of the various embodiments, a cache engine or file system engine may be arranged to determine heat extent properties, such as, heat score range, run length range, run length step values, run length offset values, or the inclusion of additional state flags based on configuration information provided by default values, configuration files, user input, policy rules, or the like. For example, some file systems may be dedicated to very large files that are usually read or written in one operation, these file systems may be configured to arrange heat extents that maximize run length representation at the expense of heat score range. In contrast, other file systems that may be optimized for more granular random access activity may be configured to use heat extents that have increased heat score range or granularity at the expense of run length range.

FIG. 7B illustrates a logical schematic of heat extent groups 712 in accordance with one or more of the various embodiments. In one or more of the various embodiments, heat extent groups are data structures that include a collection of heat extents and a heat summary data structure for that collection. In this example, heat extent group 714, heat extent group 716, and heat extent group 718 represent heat extent groups that include heat summaries for a collection heat extents. In this example, heat extent group 714 includes heat summary 720, heat extent 722, heat extent 724, heat extent 726, and heat extent 728. Likewise, heat extent group 716, includes heat summary 730, and a collection of heat extents that include heat extent 732. Other heat extent groups, such as, heat extent group 718 include a heat summary and a collection heat extents as well.

In one or more of the various embodiments, the heat extents in a heat extent group may be arranged to represent sequential sectors in a storage device (e.g., HDD), such as, the first heat extent in a the first heat extent group corresponds to the beginning of the address space of a storage volume on a storage device. In this example, heat extent 722 represents a heat extent that corresponds to the beginning of the storage address space as laid out in file storage. Accordingly, heat extent 732 corresponds to blocks located in the address space after heat extent 728.

In one or more of the various embodiments, heat extent groups or other heat extent related data structures may be stored in heat extent storage, such as, heat extent storage 318.

FIG. 7C illustrates a logical representation for splitting or combining heat extents in accordance with one or more of the various embodiments. In one or more of the various embodiments, a heat extent represents heat state for a number of blocks as defined by the run length value of the heat extent. Accordingly, in one or more of the various embodiments, if there are changes to some of the blocks represented by the heat extent and not to other blocks represented by the same heat extent, a cache engine may be arranged to split one heat extent into two or more heat extents. Likewise, in one or more of the various embodiments, the cache engine may be arranged to combine two or more heat extents into one heat extent if the blocks associated with the two or more coalesced heat extents have similar heat state.

In this example, in one or more of the various embodiments, heat extent 736 is associated 1024 sequential blocks in a file system. In this example, heat extent 736 represents 1024 block that are on cache storage and that are clean. Note, in this example, the blocks are considered clean because the block contents on cache storage are the same as the block contents on file storage. Next, in this example, if a write operation on behalf of a client changes the content in cache storage for some of the 1024 blocks represented by heat extent 736, the cache engine may be arranged to split heat extent 736 into two heat extents, shown here as heat extent 738 and heat extent 740. Accordingly, in this example, heat extent 738 represents the first 896 blocks the were previous represented by heat extent 736 that were not changed by the write operation. However, in this example, heat extent 740 has been created to represent the 128 blocks of the 1024 blocks previously represented by heat extent 736 that were modified by the write operation.

Note, in this example, the dirty flag for heat extent 738 remains unset while the dirty flag for heat extent 740 is set indicating the 128 blocks on cache storage have been changed with respect to the block contents stored on file storage. Accordingly, in some embodiments, the cache engine or file system engine may provide process that may be configured or directed synchronize the contents of the blocks represented by heat extent 740 both on cache storage on file storage. If the contents of blocks on cache storage and file storage are made the same, the dirty flags for the heat extents that represent those block may be cleared. Note, in this example, because the block contents on cache storage represented by heat extent 738 were not changed, the dirty flag for heat extent 738 remains unset. Because, in this example, even though heat extent 738 is modified, the contents of the blocks it represents were not modified.

Also, in one or more of the various embodiments, cache engine may be arranged to combine or coalesce two or more heat extents into one heat extent. This operation may be considered similar to reversing the split operation described above. In one or more of the various embodiments, the cache engine may identify two or more adjacent heat extents that have the same or similar heat state, and merge them into one heat extent that represents the blocks associated with the two or more combined heat extents.

In one or more of the various embodiments, coalescing may be restricted by the run length range of the heat extents. For example, if a file system is arranged to employ heat extents that have a run length range of 1024 blocks, the maximum number of blocks that may be represented by a combined heat extent is 1024. Thus, for example, combining four adjacent heat extents having run lengths of 128, 256, 512, 684 respectively may result in a first heat extent having a run length of 1024 and a second heat extent having a run length of 556. Note, in one or more of the various embodiments, cache engine coalescing policies may determine the distribution of blocks among combined heat extents. For example, an alternative coalescing policy may produce two adjacent heat extents with run lengths of 790 rather using the maximum run length for the first heat extent.

Figure 8:
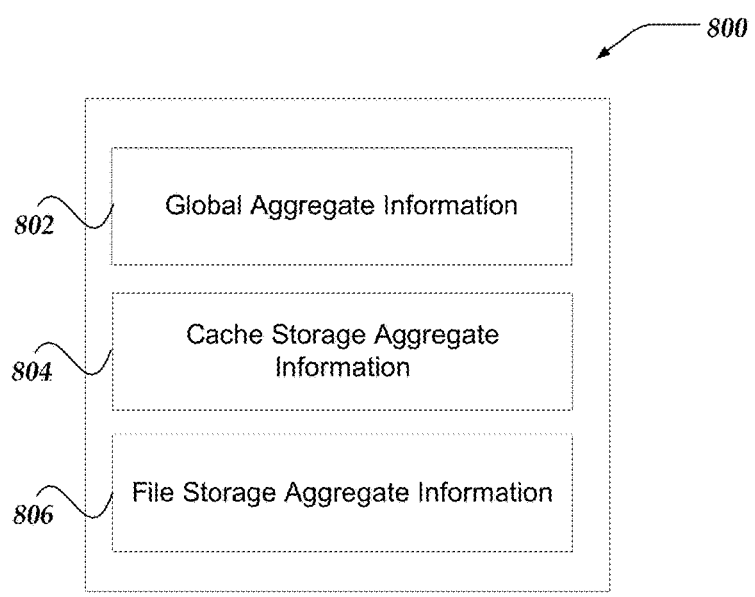
FIG. 8 illustrates a logical schematics of a heat extent summary for storing aggregate heat information for a heat extent group in accordance with one or more of the various embodiments.

FIG. 8 illustrates a logical schematics of heat extent summary 800 for storing aggregate heat information for a heat extent group in accordance with one or more of the various embodiments. In one or more of the various embodiments, As disclosed above, heat extent groups may be associated with a heat extent summary. In some embodiments, heat extent summaries, such as, heat extent summary 800 may be arranged to include summary information that describes various characteristics associated with the heat extents that comprise a heat extent group. In some embodiments, the information may include statistical information related to heat scores of the heat extent group, such as, heat score histograms, mean heat score, minimum heat score, maximum heat score, or the like. In one or more of the various embodiments, the aggregate information run length maximums, run length minimums, or the like.

In some embodiments, additional aggregate information for heat extent groups may be provided and stored in heat extent summaries based on configuration information, user input, policy rules, default values, or the like. In some embodiments, cache engines may be arranged to manage one or more background processes that may scan heat extents in a heat extent group to compute the aggregate information for storage in the heat extent summaries.

In one or more of the various embodiments, the information stored in the heat extent summaries may be employed by the cache engine or file system engine to efficiently gain insight into the population of heat extents in a given group. For example, in one or more of the various embodiments, the cache engine may be arranged to maintain heat score histograms that enable rapid analysis to determine if a heat extent group is a good candidate for cooling operations based on the distribution of heat scores within a group.

In one or more of the various embodiments, aggregate information may be categorized as global aggregate information 802, cache storage aggregate information 804, file storage aggregate information, or the like. Accordingly, in some embodiments, the cache engine may be arranged to employ global aggregate information 802 to store aggregate information related to the heat extent group as a whole. Cache storage aggregate information 804 may be employed by the cache engine to store aggregate information associated with heat extents that are associated with blocks on cache storage. And, file storage aggregate information 806 may be employed by the cache engine to store aggregate information associated with heat extents associated with blocks stored on file storage.

Generalized Operations

FIGS. 9-13 represent generalized operations for file system cache tiers in accordance with one or more of the various embodiments. In one or more of the various embodiments, processes 900, 1000, 1100, 1200, and 1300 described in conjunction with FIGS. 9-13 may be implemented by or executed by one or more processors on a single network computer (or network monitoring computer), such as, network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-13 may perform actions for file system cache tiers in accordance with at least one of the various embodiments or architectures such as those described in conjunction with FIGS. 4-8. Further, in one or more of the various embodiments, some or all of the actions performed by processes 900, 1000, 1100, 1200, and 1300 may be executed in part by file system engine 322, or cache engine 324 running on one or more processors of one or more network computers.

Figure 9:
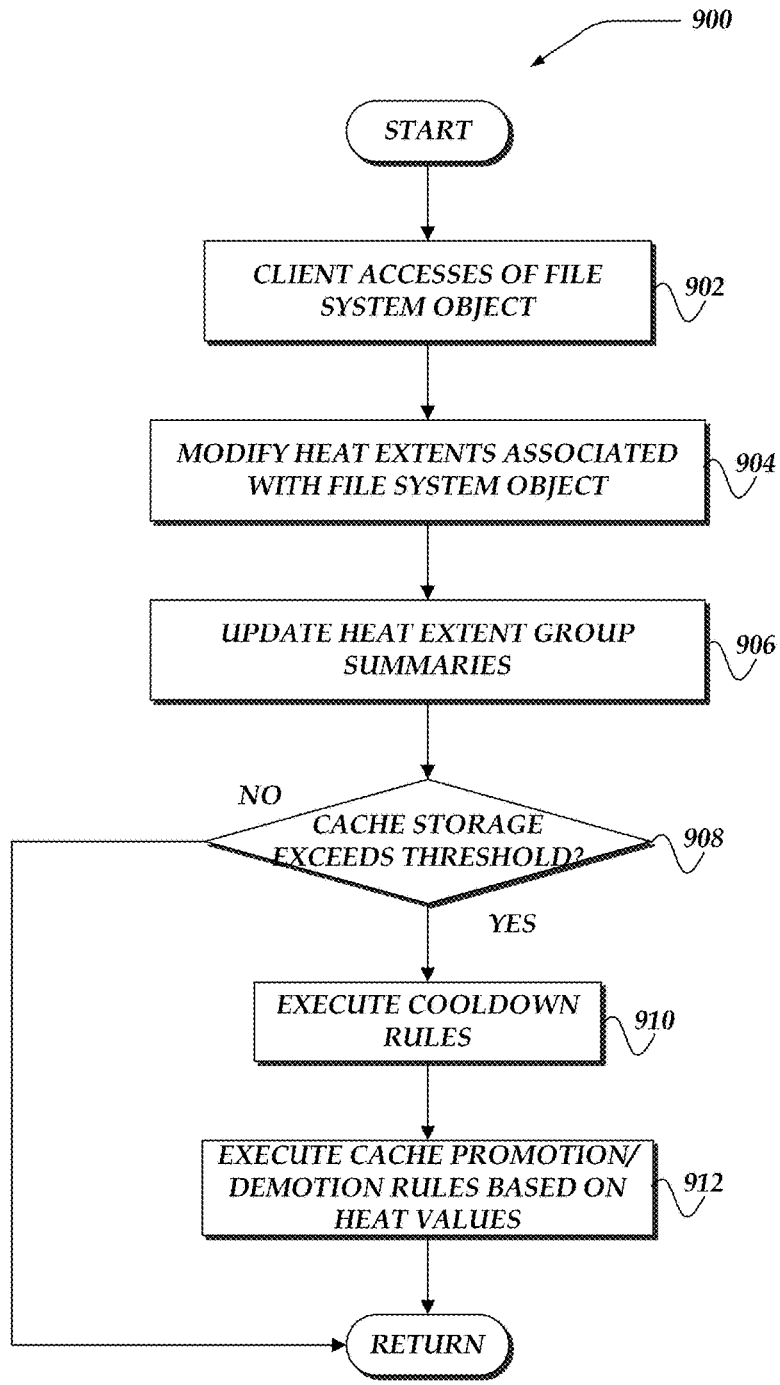
FIG. 9 illustrates an overview flowchart of a process for file system cache tiers in accordance with one or more of the various embodiments.

FIG. 9 illustrates an overview flowchart of process 900 for file system cache tiers in accordance with one or more of the various embodiments. After a start flowchart block, at flowchart block 902, in one or more of the various embodiments, one or more clients may access one or more file system objects in a file system. In one or more of the various embodiments, clients (e.g., users, applications, services, or the like) interact with file system objects by reading or writing (including deletes or unlinks) the contents of one or more blocks that may comprise a given file system object.

At flowchart block 904, in one or more of the various embodiments, the cache engine may be arranged to modify one or more heat extents that may be associated with the one or more file system objects. Accordingly, in one or more of the various embodiments, cache engines may be arranged to determine one or more heat extents that are associated with the blocks being accessed. As described above, and in more detail below, block identifiers or index values provided by the file system engine may be used to identify the heat extents that represent the one or more blocks being accessed. In some embodiments, block identifiers may be associated with where the block is stored on file storage. For example, in some embodiments, block 002 comes before block 003 on file storage. In some embodiments, block identifiers and block positions correspond to sector locations on HDDs comprising file storage such that reading five blocks in sequence from file storage may be involve reading five sectors in order from a HDD.

In one or more of the various embodiments, the cache engine may be arranged to modify the heat score of a heat extent based on the current heat score, desired heat score distribution, the type of access (e.g., read or write), or the like. In some embodiments, additional metrics or factors may be applied to influence whether a heat score should be increased or decreased. For example, in one or more of the various embodiments, each time one or more blocks are read by a client of the file system, the cache engine may be arranged to increase the heat scores associated with those blocks. Accordingly, in one or more of the various embodiments, in response to activity directed to a block, the cache engine may determine the heat extents that may be associated with the one or more blocks to increase the heat score of the determined heat extents. In some embodiments, the amount of the increase may depend on one or more heat distribution models that may be in force. In one or more of the various embodiments, the cache engine may be arranged to determine if the heat score should be increased or the amount of the increase based on one or more rules or configuration information (including heat distribution models) provided from configuration files, policy rules, default values, built-in values, user input, or the like, or combination thereof.

In one or more of the various embodiments, the cache engine may be arranged to execute one or more heating policies that consider additional metrics, such as, size of reads, size of writes, heat scores or access activity associated with neighboring blocks, or the like. Likewise, in some embodiments, one or more heating policies may be arranged to modify one or more heat scores such that the heat score distribution in a heat extent group or the file system as a whole, conform to one or more heat distribution models.

In some embodiments, the cache engine may be arranged to modify one or more heat scores as part of maintenance operations, such as, coalescing heat extents, re-balancing heat score distributions, or the like.

At flowchart block 906, in one or more of the various embodiments, the cache engine may be arranged to modify or update one or more heat extent group summaries based on operations performed on the one or more file system objects. As described above, in one or more of the various embodiments, heat extent group summaries are employed to store one or more aggregate metrics that provide a data sketch of heat extent group that corresponds to the group summary. Accordingly, in some embodiments, as heat extents are modified during ongoing cache management operations, the heat extent group summaries associated with the modified heat extents may be updated as well.

At decision block 908, in one or more of the various embodiments, if an amount memory consumed by the file system objects stored in cache storage exceeds a defined threshold, control may flow to flowchart block 910; otherwise, control may be returned to a calling process. In one or more of the various embodiments, cache management operations related to heat extents, such as, cooldown, coalescing, demotion, promotion, re-balancing, or the like, may be suspended until the utilization of cache storage exceeds a defined threshold.

At flowchart block 910, in one or more of the various embodiments, the cache engine may be arranged to execute or initiate one or more cache management operations including cooldown, coalescing, demotion, promotion, re-balancing, or the like. In one or more of the various embodiments, as blocks are accessed, the heat scores of heat extents that represent those blocks may be increased according one or more heat policies. Likewise, in one or more of the various embodiments, the cache engine may be arranged to execute one or more cooldown policies that act to decrease the heat scores of heat extents that represent blocks based on access activity. For example, in some embodiments, heat scores associated with heat extents that represent less frequently accessed blocks may be decreased accordingly one or more cooldown policies.

In one or more of the various embodiments, the cache engine may be arranged to execute cooldown policies that consider additional metrics, such as, size of reads, size of writes, heat scores or access activity associated with neighboring blocks, or the like. Likewise, in some embodiments, one or more cooldown policies may be arranged to modify one or more heat scores such that the heat score distribution in a heat extent group or the file system as a whole, conform to one or more heat distribution models.

At flowchart block 912, in one or more of the various embodiments, the cache engine may be arranged to execute or initiate one or more cache promotion rules or demotion rules based on heat scores associated with one or more heat extents. In one or more of the various embodiments, generally, the cache engine may be arranged to promote blocks associated with higher heat scores to cache storage and demote blocks associated with lower heat scores to file storage. In one or more of the various embodiments, the details of promoting blocks to cache storage or demoting block from file storage may depend on rule based policies that may be arranged to consider additional file system performance metrics. Next, in some embodiments, control may be returned to a calling process.

Figure 10:
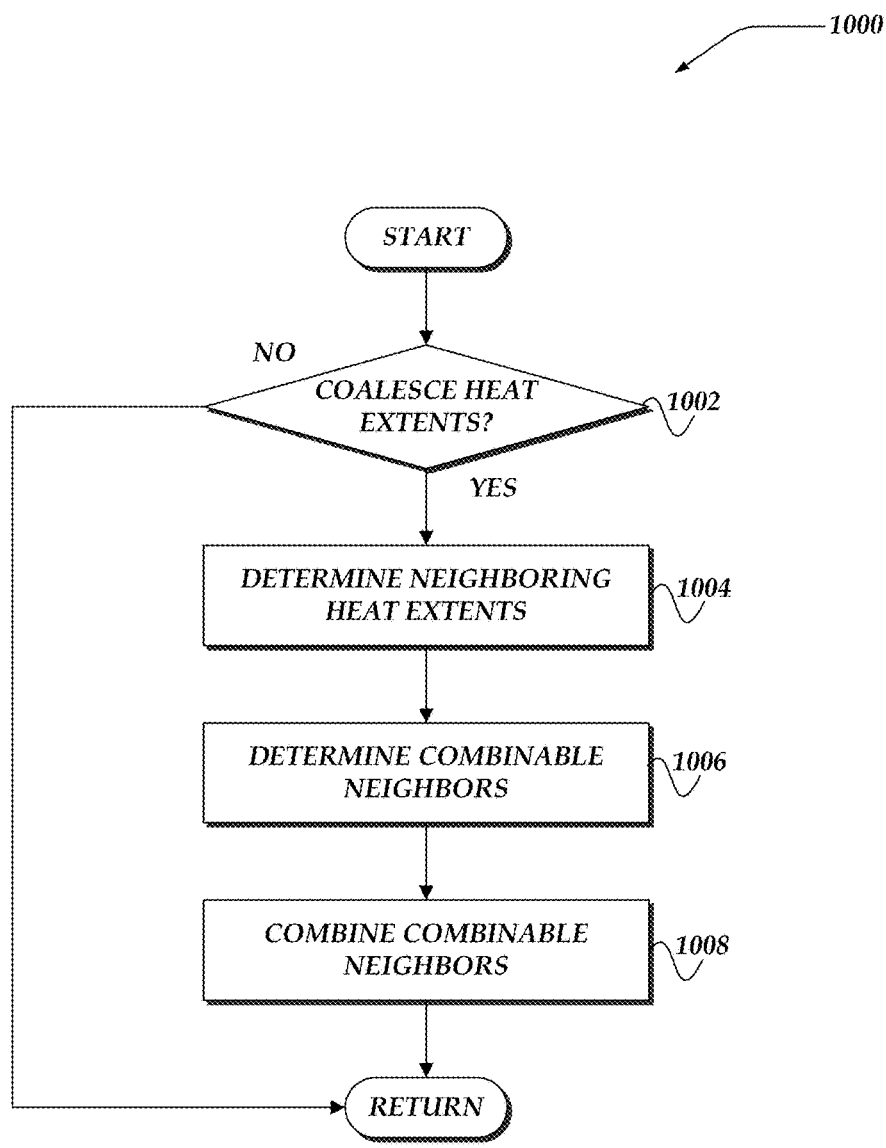
FIG. 10 illustrates a flowchart of a process for coalescing heat extents for file system cache tiers in accordance with one or more of the various embodiments.

FIG. 10 illustrates a flowchart of process 1000 for coalescing heat extents for file system cache tiers in accordance with one or more of the various embodiments. After a start flowchart block, at decision block 1002, in one or more of the various embodiments, if a cache engine initiates heat extent coalescing to combine heat extents, control may flow to flowchart block 1004; otherwise, control may be returned to a calling process. In one or more of the various embodiments, the cache engine may be arranged to employ configuration information from various sources, such as, configuration files, rule based policies, user input, built-in rules, or the like, or combination thereof, to determine if heat extent coalescing should be performed.

In one or more of the various embodiments, the cache engine may be arranged to initiate heat extent coalescing based on one or more file system metrics or file system performance metrics exceeding one or more conditions or threshold values defined in configuration information.

In one or more of the various embodiments, cache engines may perform or execute one or more background processes that periodically evaluate heat extent fragmentation to identify one or more heat extents that may be coalesced.

In one or more of the various embodiments, the cache engine may be arranged to compare the heat score distribution of heat extent groups to one or more heat distribution models to identify non-conforming heat extent group that may be candidates for coalescing.

At flowchart block 1004, in one or more of the various embodiments, the cache engine may be arranged to determine two or more neighboring heat extents. As described above, heat extents are arranged to represent blocks in file storage sector order. Thus, in one or more of the various embodiments, the cache engine may be arranged to preserve the relative/positional ordering of the heat extents to match how blocks may be arranged on file storage. Accordingly, in one or more of the various embodiments, heat extents that may be eligible may be in the same heat extent group and may be adjacent to each other.

At flowchart block 1006, in one or more of the various embodiments, the cache engine may be arranged to determine two or more combinable neighboring heat extents. In one or more of the various embodiments, combinable heat extents are adjacent heat extents that have the same location value and the same dirty flag value. In some embodiments, in most cases, heat extents that may be eligible for coalescing may have the same or similar heat scores. E.g., combinable heat extent may be adjacent heat extent with similar heat state.

In many cases, for embodiments, the cache engine may be arranged to determine adjacent heat extents that have the same heat state as eligible for coalescing. However, in some embodiments, one or more policies may enable cache engines to combine two or more heat extents with different heat states. In one or more of the various embodiments, policies may enable the coalescing of one or more heat extents that may be otherwise combinable except for having different heat scores. For example, in some embodiments, policies may allow heat extents that have near or close heat scores to be combined.

At flowchart block 1008, in one or more of the various embodiments, the cache engine may be arranged to combine the two or more combinable heat extents. In one or more of the various embodiments, combining the two or more heat extents may similar to reversing a heat extent splitting operation. In some embodiments, the cache engine may be arranged to coalesce two or more heat extents into one or more heat extents. In most cases, combinable heat extents with shorter run lengths are combined to provide heat extents having longer run lengths that are up to the maximum run length value. Next, in some embodiments, control may be returned to a calling process.

Figure 11:
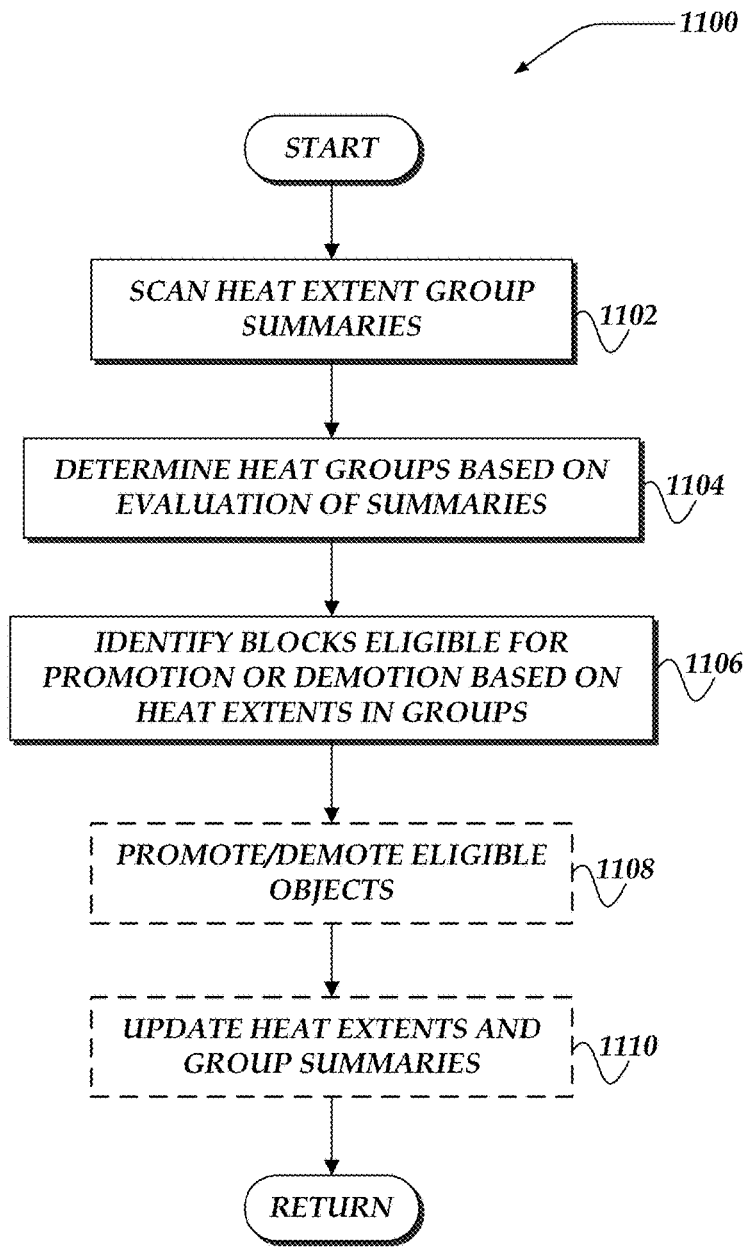
FIG. 11 illustrates a flowchart of a process for demoting or promoting file system objects between cache storage or file storage based on heat extents for file system cache tiers in accordance with one or more of the various embodiments.

FIG. 11 illustrates a flowchart of process 1100 for demoting or promoting file system objects between cache storage or file storage based on heat extents for file system cache tiers in accordance with one or more of the various embodiments. After a start flowchart block, at flowchart block 1102, in one or more of the various embodiments, a cache engine may be arranged to scan one or more heat extent group summaries. In one or more of the various embodiments, cache engines may employ configuration information or policy rules to determine if the heat extent groups should be scanned. In some embodiments, different operations, such as, cooldown, distribution re-balancing, heat extent coalescing, promotion, demotion, or the like, may be associated with the same scan operation. In other embodiments, one or more scans may be configured for one or more separate or specific operations.

In one or more of the various embodiments, the cache engine may be arranged to iterate across heat summaries associated with one or more heat extent groups. As described above, heat summaries may include heat score histograms or other aggregate information that may provide a data sketch of the heat extent groups and its constituent heat extents associated with a heat summary.

In one or more of the various embodiments, the cache engine may be arranged to scan a portion of the heat extent group summaries rather than scanning all of the heat extent groups in a file system. In some embodiments, some heat extent groups may be associated with different scan periods. For example, some number of heat extent groups may be known or expected to be dormant as compared to other heat extent groups. Accordingly, in some embodiments, such heat extent groups may be assigned a scan period that may be longer than other heat extent groups. For example: active heat extent groups may be scanned every hour; normal heat extent groups may be scanned every four hours; or dormant heat extent groups may be scanned every twenty-four hours, or the like. In one or more of the various embodiments, the cache engine may be arranged to determine scanning periods based on configuration information, policy rules, user input, or the like.

Similarly, in one or more of the various embodiments, scanning periods may be based on other file system metrics, such as, number of operations since last scan, number of blocks written since last scan, or the like.

Also, in one or more of the various embodiments, scanning may be triggered if cache storage capacity or file storage capacity of a file system is modified by adding or removing storage capacity. Likewise, in some embodiments, scans may be triggered if cache storage or file storage devices fail.

Further, in one or more of the various embodiments, one or more file system operations may be known to benefit from different cache management strategies. Accordingly, in one or more of the various embodiments, those file system operations may include triggering a scan.

At flowchart block 1104, in one or more of the various embodiments, the cache engine may be arranged to determine one or more heat extent groups that may be associated one or more blocks that may be eligible for demotion or promotion. In one or more of the various embodiments, the cache engine may be arranged to employ the heat summaries as a data sketch that provides insight into the heat extents associated with each heat extent group. For example, evaluating histograms of heat scores associated with the heat extent group may identify groups that may be associated with block that should be promoted or demoted.

In one or more of the various embodiments, the cache engine may be arranged to employ configuration information provided by one or more of configuration files, rule based policies, user input, built-in default values, or the like, to determine the heat extent group summaries that may be associated with blocks eligible for promotion or demotion. For example, in some embodiments, configuration information may define one or more heat score distribution patterns that may be associated with promotable blocks, or the like. For example, policy rules may define conditions or threshold values for one or more performance metrics or summary values that if met or exceeded indicate that a heat extent group is associated with blocks that may be promoted or demoted.

In one or more of the various embodiments, as described above, heat extent group summaries may include aggregate metrics associated with cache storage and other aggregate metrics associated with file storage. Accordingly, in some embodiments, cache engines may identify blocks on file storage that should be promoted to cache storage. Likewise, in some embodiments, cache engine may identify blocks on cache storage that should be demoted to file storage.

In one or more of the various embodiments, the cache engine may be arranged to match one or more patterns or signals from aggregate metrics included in the summaries. In one or more of the various embodiments, the rules or threshold values for identifying such patterns or signals may vary depending on the operational requirements of the file system.

In some embodiments, the patterns or signals of interest may correspond with conventional cache management. However, in some embodiments, unconventional considerations may be taken into account as defined by one or more policy rules that are adapted to one or more features of the file system, such as, storage devices, usage patterns, storage architecture, performance requirements, or the like.

For example, in some embodiments, heat extent groups that include several high heat score heat extents associated with block on file storage are likely to be selected for further evaluation because the blocks on file storage are being accessed often. Thus, in this example, file system performance is likely to be improved by promoting such block to cache storage.

However, in one or more of the various embodiments, policy rules may be arranged to identify groups that may include promotable blocks based on the observation that there are just a few heat extents in the group that have high heat scores representing blocks on file storage among many heat extents with low heat scores also on file storage. In this case, the group may be selected as likely to include promotable blocks because repeatedly accessing one or a few blocks on HDD file storage may impact performance because of the seek-time required each time to access the few blocks. Accordingly, in this example, identifying the few hot blocks associated with an otherwise cool group may provide outsized performance improvements even though the quantity of data associated with the hot blocks is relatively small.

In one or more of the various embodiments, the cache engine may be arranged to compare heat extent group summary information to one or more heat distribution models to identify heat extent groups that do not conform to the one or more heat distribution models. For example, in one or more of the various embodiments, heat distribution models may include reference heat histograms that may be compared to the heat score histograms included in heat extent group summary information.

At flowchart block 1106, in one or more of the various embodiments, the cache engine may be arranged to identify one or more blocks in the one or more heat extent groups that may be eligible for demotion or promotion. In one or more of the various embodiments, the cache engine may be arranged to scan the heat extents included in the determined heat extent groups to identify heat extents that should be promoted or demoted. In one or more of the various embodiments, the cache engine may be arranged to visit each heat extent included in the one or more heat extent groups determined in flowchart block 1104 to compare the heat state represented of heat extent against one or more policy rules or conditions to identify blocks that may be eligible for promotion or demotion.

In one or more of the various embodiments, the cache engine may be arranged to apply one or more policy rules or conditions that may evaluate the entire heat state included in the heat extents, such as, location, dirty status, run length, or the like. For example, if a heat extent has a high heat score and it represents blocks on cache storage, that heat extent is unlikely to represent blocks that should be demoted. In contrast, if a heat extent representing blocks on cache storage has a low heat score, it may be eligible for demotion.

In one or more of the various embodiments, the eligibility for demotion or promotion may depend on the current run length value of a heat extent. For example, a heat extent representing blocks on file storage with a high heat score and low run length may be a prioritized for promotion because the small-sized reads that are driving up the heat score may cause outsized HDD seek-time delays that may degrade file system performance. In contrast, in one or more of the various embodiments, other policy rules may prioritize heat extents with maximum run lengths for promotion or demotion depending on the operational goals that underlie the policies.

In one or more of the various embodiments, the cache engine may be arranged to adapt promotion or demotion operations based on one or more rule based policies. Accordingly, in one or more of the various embodiments, the cache engine may be arranged to determine one or more blocks that are eligible for promotion based on one or more performance metrics, such as, storage capacity of cache storage or file storage, average read size, average write size, read rates, write rates, access behavior (e.g., random access versus sequential streaming), protection level requirements, or the like.

For example, a policy may trigger aggressive demotion of blocks from cache storage if the cache storage volume is filled to a defined threshold value. Continuing with this example, if one or more utilization metrics associated with cache storage exceed one or more defined threshold values, the cache engine may begin identifying one or more blocks as eligible for demotion using a heat score threshold value that is higher than normal operations.

Also, for example, in some embodiments, storage device failure may trigger policies that cause either file storage or cache storage to perform additional duties, such as, providing data protection, storing recovery journals, storing additional logging, providing temporary working space for data recovery operations, or the like. Accordingly, demotion or promotion policy may adapt to the storage requirements for such additional duties.

In one or more of the various embodiments, heating policy, cooling policy, demotion policy, promotion policy, or the like, may be arranged to preserve or enhance the durability or improved of the storage devices that may comprise the cache storage tier or the file storage tier. Accordingly, in one or more of the various embodiments, policies and heat distribution models may be arranged to implement strategies that may reduce the wear on one or more storage devices. For example, in some embodiments, if cache storage is comprised of SSDs, SSD wear leveling strategies may be enforced to reduce the wear that may be caused by writes to SSD. Accordingly, in some embodiments, one or more of the various cache related policies may be skewed to reduce the number of writes to cache storage at the expense of other performance metrics.

At flowchart block 1108, in one or more of the various embodiments, optionally the cache engine or file system engine may be arranged to demote or promote the one or more eligible file system objects. In one or more of the various embodiments, this may include storing the contents of promoted blocks on cache storage. Likewise, in some embodiments, this may include storing the contents of demoted blocks on file storage.

In one or more of the various embodiments, the contents of one or more blocks stored on cache storage may be the same as the contents of the corresponding blocks stored on file storage. Accordingly, in one or more of the various embodiments, the promotion or demotion of such blocks may not require moving or copying data from one storage tier to another. For example, if the heat extents associated with the blocks being demoted or promoted have the clean flag set, this may indicate that the content of the blocks on the different storage tiers may be identical.

In one or more of the various embodiments, determining safe or optimum times to promote or demote blocks within storage tiers may depend on conditions that may be beyond the control or visibility of the cache engine. In one or more of the various embodiments, other pending file system operations may have precedence over operations performed by cache engines. For example, in some embodiments, access to one or more blocks, storage devices, or the like, may be limited or blocked for synchronization operations, backups, data recovery operations, indexing, or the like. Accordingly, in one or more of the various embodiments, one or more promotion or demotion operations may be queued and performed later based on policies or priorities enforced by the file system engine.

Note, this flowchart block is indicated as being optional because there may be one or more operational considerations or one or more conditions that may require the deferral or delay of the promotion or demotion of one or more blocks that may otherwise be eligible for promotion of demotion.

At flowchart block 1110, in one or more of the various embodiments, optionally, the cache engine may be arranged to update the one or more heat extents or heat extent group summaries to reflect the promotion or demotion of the one or more blocks that may be determined to eligible for promotion or demotion. For example, in one or more of the various embodiments, the cache engine may be arranged to update the location flag of heat extents associated with blocks promoted or demoted.

Note, this flowchart block is indicated as being optional because there may be one or more operational considerations or one or more conditions that may require the deferral or delay of the promotion or demotion of one or more blocks that may otherwise be eligible for promotion of demotion. Next, in some embodiments, control may be returned to a calling object.

Figure 12:
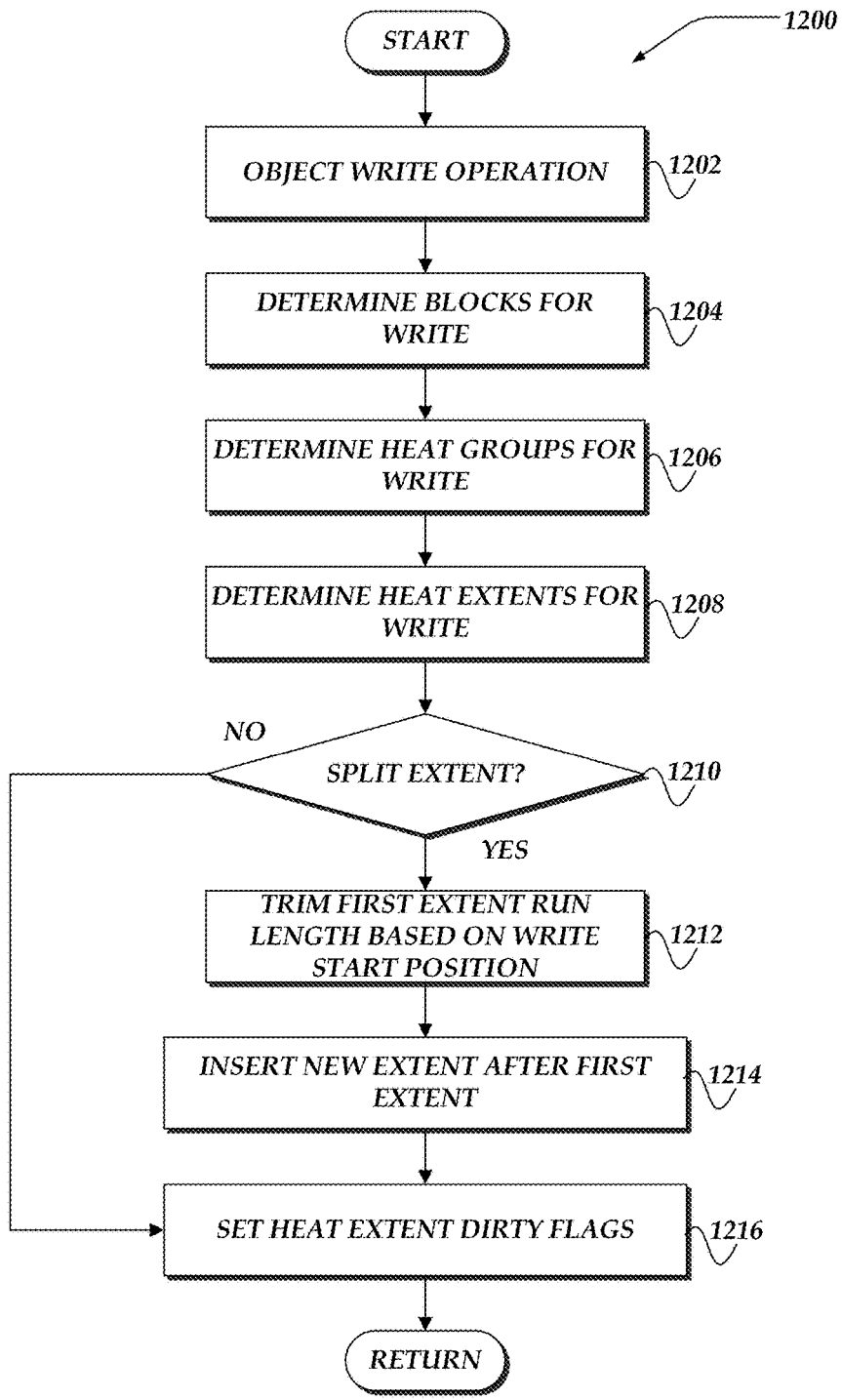
FIG. 12 illustrates a flowchart of a process for processing heat extents for write operations for file system cache tiers in accordance with one or more of the various embodiments.

FIG. 12 illustrates a flowchart of process 1200 for processing heat extents for write operations for file system cache tiers in accordance with one or more of the various embodiments. After a start flowchart block, at flowchart block 1202, in one or more of the various embodiments, a file system engine may receive a write operation request from one or more clients, or the like. Accordingly, in one or more of the various embodiments, a cache engine may be instantiated to perform one or more actions for updating the heat extents based on the write operation.

In one or more of the various embodiments, write operations may be file writes that may occur during normal file system operations. For example, the write may result from various applications, services, or the like, in response to user or system activity. In some embodiments, the writes may be associated with one or more file system maintenance operations initiated by the operating system, the file system engine, cache engine, or the like.

At flowchart block 1204, in one or more of the various embodiments, the cache engine may be arranged to determine one or more blocks that may be associated with the write operations. In one or more of the various embodiments, writes may be initiated from client users, such as, applications, services, command line operations, or the like. In some embodiments, many write operations may be associated with one or my higher level file system objects that may be comprised of one or more blocks (e.g., low level file system objects). Accordingly, in one or more of the various embodiments, the file system engine may be arranged to decompose write operations associated with higher level file system objects into blocks.

In one or more of the various embodiments, the cache engine may be provided file system object information that enables it compute the blocks that are associated with the writes. For example, a user may initiate an update to a document comprised of many low level block objects. The file system engine may provide the cache engine index or addressing information that may be used to determine the blocks that are associated with the write operation.

Accordingly, in one or more of the various embodiments, the cache engine may compute or be provided information to identify the one or more sequences of blocks corresponding to the write. In some embodiments, the file system engine may be arranged to label or index blocks such that are arranged in sequential order on file storage. Further, in one or more of the various embodiments, most of the application context may be abstracted away from the cache engine. Accordingly, in some embodiments, cache engines may be provided a collection of block identifiers that correspond to the write operation absent higher level application context. In some embodiments, the cache engine may be provided a collection of block identifiers, block identifiers and run lengths pairs, or the like.

At flowchart block 1206, in one or more of the various embodiments, the cache engine may be arranged to determine the one or more heat extent groups that may be associated with the blocks that are associated with the write operation.

As described above, in one or more of the various embodiments, heat extent groups may be associated with one or more heat extents. And, those heat extents may be associated with one or more blocks. Accordingly, in one or more of the various embodiments, the cache engine may scan the heat extent groups to determine the one or more heat extent groups that may be associated with one or more blocks associated with the write operation.

In one or more of the various embodiments, each heat extent group may be associated with a fixed number of blocks of a given size. Accordingly, in some embodiments, given a block position. the cache engine may rapidly compute which heat extent group is associated with that block. For example, in some embodiments, heat extent groups in a file system may be configured to being associated with 256,000 blocks. Accordingly, in this example, if a block has a position of 32,000, the cache engine may determine that the block is associated with the first heat extent group. Likewise, for example, if the block has a position of 350,000, it may be associated with the second heat extent group, and so on.

At flowchart block 1208, in one or more of the various embodiments, the cache engine may be arranged to determine one or more heat extents that may be associated with the write operations based on the determined blocks and the determined heat extent groups. In one or more of the various embodiments, the cache engine may be arranged to derive the one or more heat extents that may be associated with the write from the block information provided by the file system engine.

In one or more of the various embodiments, the cache engine may be arranged to determine the heat extents in a heat extent group that may be associated with the write based on determining the position of each block with respect to its position in file storage based on the block identifier (ID) or index number and heat extern run length values. For example block ID 0 may be the first block corresponding to the first heat extent in the first heat extent group.

In one or more of the various embodiments, the cache engine may be arranged to map each block ID or index value to a specific heat extent. In some embodiments, the cache engine may scan the collection of heat extents in the one or more heat extent groups until the heat extent associated with a block is determined.

For example, in one or more of the various embodiments, if the starting block position for a heat extent group is 112,000 and the block position of interest is 135,500, the cache engine may start at the first heat extent in the group and walk the collection of heat extents, stepping by the run length value of the heat extents. For example, if the run length for the first four heat extents in the group is 4096, the block at position 135,500 will be associated with the fifth heat extent in the group. Note, in one or more of the various embodiments, the run length value for heat extents in a group may vary depending on heat extent splitting. Accordingly, in some embodiments, the cache engine may be arranged to "count" up to determine the correct heat extent based on the run length values of the previously visited heat extents in the group.

At decision block 1210, in one or more of the various embodiments, if the cache engine determines one or more heat extents may be split, control may flow to flowchart block 1212; otherwise, control may flow to flowchart block 1216. In one or more of the various embodiments, as described above, a heat extent may represent heat score information for many blocks. The number of blocks represented by a single heat extent may be determined based on its current run length value.

In some embodiments, the write operation may cause some of the blocks associated with a heat extent to have different heat state than other blocks that are associated with the same heat extent. Accordingly, in one or more of the various embodiments, the cache engine may be arranged to split the affected heat extent to preserve the heat state of the blocks not associated with the write operation. For example, if the blocks associated with the write operation (e.g., write blocks) fall in the middle of a heat extent, the heat extent may need to be split.

In one or more of the various embodiments, if the position of one or more write blocks corresponds to the "inside" of a heat extent, that heat extent may require splitting. In some embodiments, splitting may be required if the write operation associates blocks having (or blocks that should have) different heat state with the same heat extent.

In one or more of the various embodiments, if the write operation does not change the heat state of the write blocks, the heat extent may not require splitting. In one or more of the various embodiments, if the heat extent associated with one or more write blocks will not have its heat score, location flag, or dirty flag modified because of the write, the heat extent may not require splitting. For example, in some embodiments, a previous write operation may have updated the heat state represented a heat extent such that a subsequent near-in-time write that is associated with one or more blocks "in the middle" of that heat extent. Accordingly, because the subsequent write does not create an heat state mismatch among blocks associated with the heat extent, splitting may not be required.

Also, in one or more of the various embodiments, if a write operation is associated with write blocks that cover an entire heat extent, the heat state of the heat extent may be updated without requiring splitting.

See, FIG. 7C for an illustration of splitting a heat extent.

At flowchart block 1212, in one or more of the various embodiments, the cache engine may be arranged to truncate the first heat extent run length based on the starting position of the blocks associated with the write operations. In one or more of the various embodiments, the cache engine may be arranged to reduce the run length value of the heat extent that requires splitting. This new run length value may be based on the position of the first write block that intersected the run length of the heat extent being split. For example, if a heat extent represents blocks at position 0 through position 4095 and a sequence of write blocks start with a block at position 512, the first heat extent may be trimmed by setting its run length value to 511. Accordingly, in one or more of the various embodiments, the heat extent may be modified so it now represents blocks that are not associated with the write operation.

At flowchart block 1214, in one or more of the various embodiments, the cache engine may be arranged to insert one or two new heat extents after the first heat extent. In one or more of the various embodiments, a new heat extent may be generated to represent the blocks that are no longer represented by the first heat extent described in block 1212. Continuing with the example, introduced in flowchart block 1212, the new heat extent will have a run length that is computed using the block at position 512 as its starting point.

In some embodiments, the run length of the new heat extents may be set according to the number of write blocks and the maximum run length value. In some embodiments, the new heat extent may be arranged to have a maximum run length up to the start of the next heat extent in the group.

In one or more of the various embodiments, a write operation may be associated with write blocks all fall inside a heat extent rather than continuing past the end of the intersected heat extent. For example, in some embodiments, if the write operation includes 256 write blocks and the positions of the block is such that the entire set of write blocks falls within a heat extent, two new heat extent may be generated. The first heat extent may be generated to represent the write blocks and a second heat extent may be generated to represent the block that were in the first heat extent but come after the write blocks.

At flowchart block 1216, in one or more of the various embodiments, the cache engine may be arranged to set the dirty flag for one or more heat extents associated with the write operations. In one or more of the various embodiments, the dirty flag may be set for the heat extents that represent the write blocks that are associated with the write operation.

In one or more of the various embodiments, the cache engine may be arranged to set the dirty flags of the one or more new heat extent created by the splitting process. Likewise, in one or more of the various embodiments, the dirty flag of previously existing heat extents that are associated with write blocks may be set. Next, control may be returned to a calling process.

Figure 13:
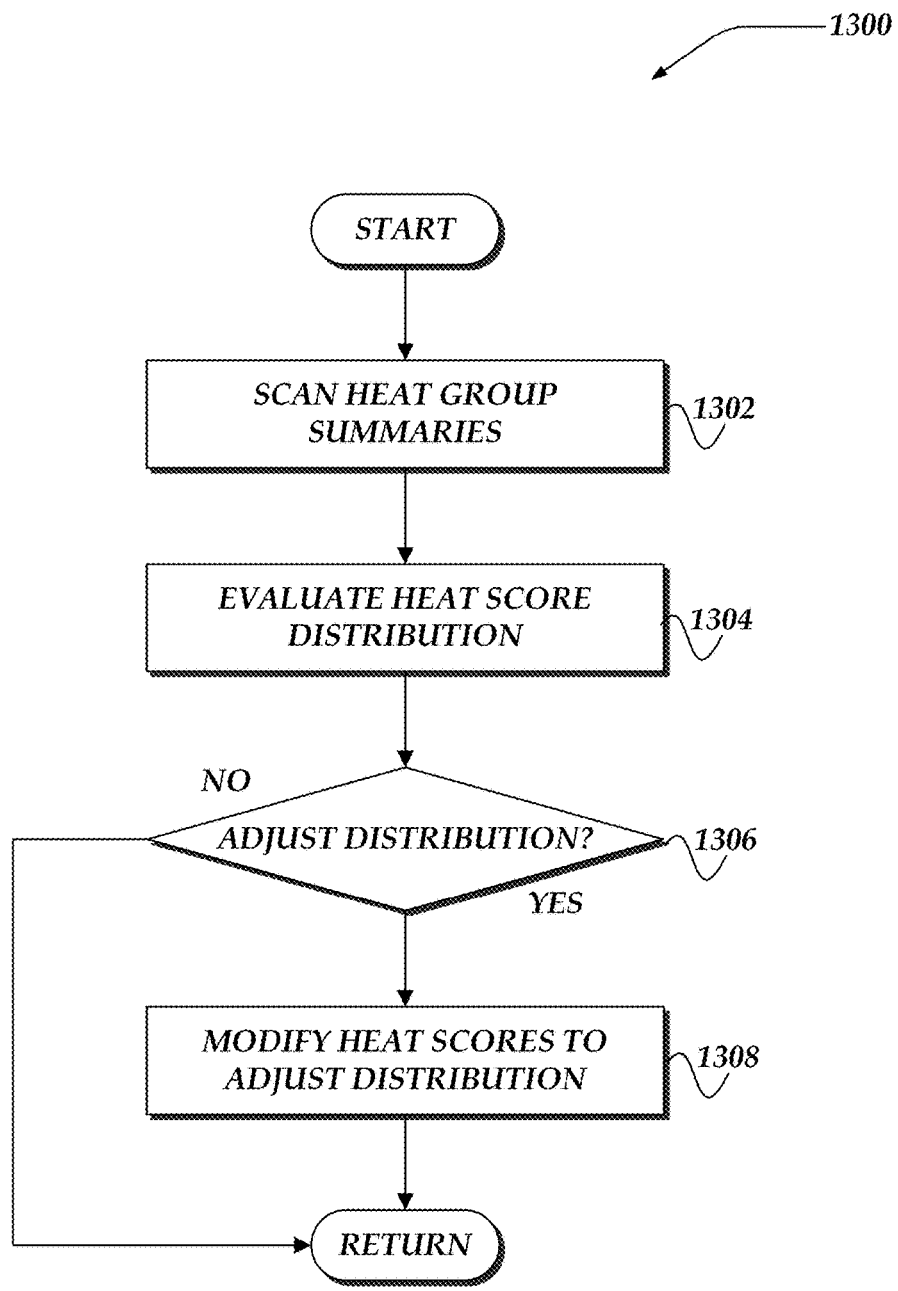
FIG. 13 illustrates a flowchart of a process for balancing heat extents based on the distribution of heat score for file system cache tiers in accordance with one or more of the various embodiments.

FIG. 13 illustrates a flowchart of process 1300 for balancing heat extents based on the distribution of heat score for file system cache tiers in accordance with one or more of the various embodiments. After a start flowchart block, at flowchart block 1302, in one or more of the various embodiments, the cache engine may be arranged to scan one or more heat extent group summaries. In one or more of the various embodiments, cache engines may employ configuration information or policy rules to determine if the heat extent groups should be scanned. In some embodiments, different operations, such as, re-balancing, heat extent coalescing, or the like, may be associated with the same scan operations. In other embodiments, one or more scans may be configured for one or more separate or specific operations.

In one or more of the various embodiments, the cache engine may be arranged to iterate across heat summaries associated with one or more heat extent groups. As described above, heat summaries include heat score histograms or other aggregate information that may provide a data sketch of the heat extent groups associated with a heat summary.

In one or more of the various embodiments, the cache engine may be arranged to scan a portion of the heat extent group summaries rather than scanning all of the heat extent groups in a file system. In some embodiments, some heat extent groups may be associated with different distribution check periods. For example, some number of heat extent groups may be known or expected to be dormant as compared to other heat extent groups. Accordingly, in some embodiments, such heat extent group may be assigned a re-balancing period that longer than other heat extent groups. For example: active heat extent groups may be checked for re-balancing every hour; normal heat extent groups may be checked for re-balancing every four hours; or dormant heat extent groups may be checked for re-balancing every twenty-four hours, or the like. In one or more of the various embodiments, the cache engine may be arranged to determine scanning or re-balancing periods may be based on configuration information, policy rules, user input, or the like.

Similarly, in one or more of the various embodiments, scanning or re-balancing periods may be based on other file system metrics, such as, number of operations since last balancing, number of blocks written since last rebalancing, or the like.

Also, in one or more of the various embodiments, re-balancing may be triggered if cache storage capacity or file storage capacity of a file system is modified by adding or removing storage capacity. Likewise, in some embodiments, re-balancing may be triggered if cache storage or file storage devices fail.

Further, in one or more of the various embodiments, one or more file system operations may be known to benefit from particular distributions of heat scores. Accordingly, in one or more of the various embodiments, those file system operations may include triggering a distribution rebalance. Also, in one or more of the various embodiments, the cache engine may be arranged to detect operation patterns that may trigger a distribution re-balance.

In one or more of the various embodiments, the cache engine may be arranged to learn to identify behavior patterns or time periods of activity that may benefit from particular distribution patterns. Accordingly, in one or more of the various embodiments, upon determination of the occurrence of a triggering pattern or time period, the cache engine may be arranged to perform a distribution rebalance. In some cases, the learning may be based on heuristics that compare file system performance metrics for some distributions with file system performance metrics for other distributions. In some embodiments, historical file system behavior information and the associated heat score distribution information may be used to generate machine learning models or classifiers that may be used to trigger rebalancing the distribution of heat scores for one or more heat extent groups.

At flowchart block 1304, in one or more of the various embodiments, the cache engine may be arranged to evaluate the heat score distribution for the heat extent groups. In one or more of the various embodiments, the cache engine may be arranged to compare histogram information included in the heat summaries one or more expected or distribution patterns to determine if the distribution of heat scores in a heat extent group may be a candidate for re-balancing.

In one or more of the various embodiments, the cache engine may be arranged to identify one or more heat extent groups that may have disadvantageous distributions of heat scores based on the comparison to one or more distribution models, or the like. For example, heat extent group that deviate beyond a defined threshold value may be determined to have disadvantageous distributions of heat scores.

At decision block 1306, in one or more of the various embodiments, if the distribution of heat scores associated with one or more heat extent group may be adjusted, control may flow block 1308; otherwise, control may be returned to a calling process. In one or more of the various embodiments, the cache engine may be arranged to register or queue one or more operations or processes that may perform one or more of the re-balancing actions during idle or otherwise advantageous times.

At flowchart block 1308, in one or more of the various embodiments, the cache engine may be arranged to modify one or more heat scores associated with one or more heat extents to adjust the distribution of heat scores. In one or more of the various embodiments, the cache engine may be arranged to visit each heat extent group that may be eligible for re-balancing and iterated or each of the associated heat extents. Accordingly, in one or more of the various embodiments, the heat scores for the visited heat extents may be increased or decreased to conform the distribution of heat scores in heat extent group to the selected or desired distribution pattern.

In one or more of the various embodiments, the particular distribution of heat scores may be determined based on configuration information, policy rules, user input, machine learning classifiers, heuristic rules, or the like.

Next, control may be returned to a calling process.

It will be understood that each flowchart block of the flowchart illustrations, and combinations of flowchart blocks in the flowchart illustrations, can be implemented by computer program instructions. These program instructions may be provided to a processor to produce a machine, such that the instructions, which execute on the processor, create means for implementing the actions specified in the flowchart block or flowchart blocks. The computer program instructions may be executed by a processor to cause a series of operational steps to be performed by the processor to produce a computer-implemented process such that the instructions, which execute on the processor to provide steps for implementing the actions specified in the flowchart block or flowchart blocks. The computer program instructions may also cause at least some of the operational steps shown in the blocks of the flowchart to be performed in parallel. Moreover, some of the steps may also be performed across more than one processor, such as might arise in a multiprocessor computer system. In addition, one or more flowchart blocks or combinations of flowchart blocks in the flowchart illustration may also be performed concurrently with other flowchart blocks or combinations of flowchart blocks, or even in a different sequence than illustrated without departing from the scope or spirit of the invention.

Accordingly, flowchart blocks of the flowchart illustration support combinations of means for performing the specified actions, combinations of steps for performing the specified actions and program instruction means for performing the specified actions. It will also be understood that each flowchart block of the flowchart illustration, and combinations of flowchart blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
   instantiating a file system engine to perform actions including:
      providing a file system that includes a plurality of blocks on a file storage tier, wherein a portion of the plurality of blocks are associated with a cache storage tier; and
   instantiating a cache engine that performs actions, including:
      providing one or more heat extents that include a heat score and a run length value, wherein the one or more heat extents are stateful representations of one or more activities associated with one or more of the plurality of blocks;

monitoring the one or more activities associated with the one or more blocks;

determining the one or more heat extents associated with the one or more activities based on a position of the one or more blocks, wherein the position corresponds with the run length values of the one or more heat extents and one or more sectors on the file storage tier that are associated with the one or more blocks;

modifying the one or more heat scores associated with the one or more heat extents based on the one or more activities and one or more distribution models, wherein the modification includes decreasing the one or more heat scores to conform the one or more heat extents with the one or more distribution models, and wherein the modification improves efficiency and performance of the one or more processors by reducing consumption of computing resources;

employing the one or more distribution models to provide different groups of summaries of the one or more heat extents based on a time period assigned for checking distribution of the one or more activities associated with the plurality of blocks, wherein a summary group of active heat extents is assigned a shortest time period for checking distribution and a summary group of dormant heat extents is assigned a longest time period for checking distribution; and disassociating the one or more blocks from the cache storage tier that are associated with heat scores that are less than a threshold value provided by the one or more distribution models.

2. The method of claim 1, wherein the cache engine performs further actions comprising:

associating the one or more heat extents with one or more groups based on a position of the one or more blocks on the file storage tier;

providing summary information associated with the one or more groups; and determining the one or more heat extents for modification based on the summary information.

3. The method of claim 1, wherein the cache engine performs further actions comprising:

determining one or more adjacent heat extents;

determining two or more combinable heat extents of the one or more adjacent heat extents, wherein the two or more combinable heat extents have a same heat score, and wherein a sum of the run length values for the two or more combinable heat extents are less than a heat extent threshold value; and combining the two or more combinable heat extents.

4. The method of claim 1, wherein monitoring the one or more activities further comprises:

in response to an activity being a write activity, performing further actions, including:

determining a first heat extent that is associated with the one or more blocks associated with the write activity based on a starting position of the write activity and the run length value of the one or more heat extents;

truncating the run length of the first heat extent based on the starting position of the write activity; and providing a second heat extent that is associated with the one or more blocks associated with the write activity, wherein a run length of the second heat extent is based on a remainder of the run length of the first extent and a run length threshold value.

5. The method of claim 1, wherein providing the one or more heat extents, further comprises, determining a location of the one or more blocks associated with the one or more heat extents based on a location attribute that is included in the one or more heat extents, wherein the location is one of the cache storage tier or the file storage tier.

6. The method of claim 1, wherein the cache engine performs further actions, including, determining a number of blocks associated with each heat extent based on the run length value associated with each heat extent, wherein, the number of blocks associated with each heat extent corresponds with its run length value.

7. The method of claim 1, wherein the cache engine performs further actions, including:

associating the one or more heat extents with the one or more groups based on the position of the one or more blocks on the file storage tier;

determining the one or more groups that require a rebalancing of heat scores based on the one or more distribution models; and rebalancing the heat scores associated with the one or more heat extents associated with the one or more determined groups to conform to the one or more distribution models.

8. The method of claim 1, wherein the cache engine performs further actions, including:

modifying the one or more heat scores associated with the one or more heat extents based on the one or more activities and one or more distribution models, wherein the modification includes increasing the one or more heat scores to conform the one or more heat extents with the one or more distribution models;

associating one or more blocks with the file storage tier that are associated with heat scores that exceed a threshold value provided by the one or more distribution models; and copying contents of the one or more associated blocks to the cache storage tier.

9. A processor readable non-transitory storage media that includes instructions for managing data in a file system over a network, wherein execution of the instructions by one or more processors on one or more network computers performs actions, comprising:

instantiating a file system engine to perform actions including:

providing a file system that includes a plurality of blocks on a file storage tier, wherein a portion of the plurality of blocks are associated with a cache storage tier; and instantiating a cache engine that performs actions, including:

providing one or more heat extents that include a heat score and a run length value, wherein the one or more heat extents are stateful representations of one or more activities associated with one or more of the plurality blocks;

monitoring the one or more activities associated with the one or more blocks;

determining the one or more heat extents associated with the one or more activities based on a position of the one or more blocks, wherein the position corresponds with the run length values of the one or more heat extents and one or more sectors on the file storage tier that are associated with the one or more blocks;

modifying the one or more heat scores associated with the one or more heat extents based on the one or more activities and one or more distribution models, wherein the modification includes decreasing the one or more heat scores to conform the one or more heat extents with the one or more distribution models, and wherein the modification improves efficiency and performance of the one or more processors by reducing consumption of computing resources;

employing the one or more distribution models to provide different groups of summaries of the one or more heat extents based on a time period assigned for checking distribution of the one or more activities associated with the plurality of blocks, wherein a summary group of active heat extents is assigned a shortest time period for checking distribution and a summary group of dormant heat extents is assigned a longest time period for checking distribution; and disassociating the one or more blocks from the cache storage tier that are associated with heat scores that are less than a threshold value provided by the one or more distribution models.

10. The media of claim 9, wherein the cache engine performs further actions comprising:
associating the one or more heat extents with one or more groups based on a position of the one or more blocks on the file storage tier;
providing summary information associated with the one or more groups; and
determining the one or more heat extents for modification based on the summary information.

11. The media of claim 9, wherein the cache engine performs further actions comprising:
determining one or more adjacent heat extents;
determining two or more combinable heat extents of the one or more adjacent heat extents, wherein the two or more combinable heat extents have a same heat score, and wherein a sum of the run length values for the two or more combinable heat extents are less than a heat extent threshold value; and
combining the two or more combinable heat extents.

12. The media of claim 9, wherein monitoring the one or more activities further comprises:
in response to an activity being a write activity, performing further actions, including:
determining a first heat extent that is associated with the one or more blocks associated with the write activity based on a starting position of the write activity and the run length value of the one or more heat extents;
truncating the run length of the first heat extent based on the starting position of the write activity; and
providing a second heat extent that is associated with the one or more blocks associated with the write activity, wherein a run length of the second heat extent is based on a remainder of the run length of the first extent and a run length threshold value.

13. The media of claim 9, wherein providing the one or more heat extents, further comprises, determining a location of the one or more blocks associated with the one or more heat extents based on a location attribute that is included in the one or more heat extents, wherein the location is one of the cache storage tier or the file storage tier.

14. The media of claim 9, wherein the cache engine performs further actions, including, determining a number of blocks associated with each heat extent based on the run length value associated with each heat extent, wherein, the number of blocks associated with each heat extent corresponds with its run length value.

15. The media of claim 9, wherein the cache engine performs further actions, including:
associating the one or more heat extents with the one or more groups based on the position of the one or more blocks on the file storage tier;
determining the one or more groups that require a rebalancing of heat scores based on the one or more distribution models; and
rebalancing the heat scores associated with the one or more heat extents associated with the one or more determined groups to conform to the one or more distribution models.

16. A system for managing data in a file system comprising:
a network computer, comprising:
a transceiver that communicates over the network;
a memory that stores at least instructions; and
one or more processors that execute instructions that perform actions, including:
instantiating a file system engine to perform actions including:
providing a file system that includes a plurality of blocks on a file storage tier, wherein a portion of the plurality of blocks are associated with a cache storage tier; and
instantiating a cache engine that performs actions, including:
providing one or more heat extents that include a heat score and a run length value, wherein the one or more heat extents are stateful representations of one or more activities associated with one or more of the plurality blocks;
monitoring the one or more activities associated with the one or more blocks;
determining the one or more heat extents associated with the one or more activities based on a position of the one or more blocks, wherein the position corresponds with the run length values of the one or more heat extents and one or more sectors on the file storage tier that are associated with the one or more blocks;
modifying the one or more heat scores associated with the one or more heat extents based on the one or more activities and one or more distribution models, wherein the modification includes decreasing the one or more heat scores to conform the one or more heat extents with the one or more distribution models, and wherein the modification improves efficiency and performance of the one or more processors by reducing consumption of computing resources;
employing the one or more distribution models to provide different groups of summaries of the one or more heat extents based on a time period assigned for checking distribution of the one or more activities associated with the plurality of blocks, wherein a summary group of active heat extents is assigned a shortest time period for checking distribution and a summary group of dormant heat extents is assigned a longest time period for checking distribution; and
disassociating the one or more blocks from the cache storage tier that are associated with heat scores that are less than a threshold value provided by the one or more distribution models; and a client computer, comprising:
  a transceiver that communicates over the network;
  a memory that stores at least instructions; and
  one or more processors that execute instructions that perform actions, including:
    providing one or more of the one or more activities associated with the one or more blocks.

17. The system of claim 16, wherein the cache engine performs further actions comprising:
  associating the one or more heat extents with one or more groups based on a position of the one or more blocks on the file storage tier;
  providing summary information associated with the one or more groups; and
  determining the one or more heat extents for modification based on the summary information.

18. The system of claim 16, wherein the cache engine performs further actions comprising:
  determining one or more adjacent heat extents;
  determining two or more combinable heat extents of the one or more adjacent heat extents, wherein the two or more combinable heat extents have a same heat score, and wherein a sum of the run length values for the two or more combinable heat extents are less than a heat extent threshold value; and
  combining the two or more combinable heat extents.

19. The system of claim 16, wherein monitoring the one or more activities further comprises:
  in response to an activity being a write activity, performing further actions, including:
    determining a first heat extent that is associated with the one or more blocks associated with the write activity based on a starting position of the write activity and the run length value of the one or more heat extents;
    truncating the run length of the first heat extent based on the starting position of the write activity; and
    providing a second heat extent that is associated with the one or more blocks associated with the write activity, wherein a run length of the second heat extent is based on a remainder of the run length of the first extent and a run length threshold value.

20. The system of claim 16, wherein providing the one or more heat extents, further comprises, determining a location of the one or more blocks associated with the one or more heat extents based on a location attribute that is included in the one or more heat extents, wherein the location is one or the cache storage tier or the file storage tier.

21. The system of claim 16, wherein the cache engine performs further actions, including, determining a number of blocks associated with each heat extent based on the run length value associated with each heat extent, wherein, the number of blocks associated with each heat extent corresponds with its run length value.

22. The system of claim 16, wherein the cache engine performs further actions, including:
  associating the one or more heat extents with the one or more groups based on the position of the one or more blocks on the file storage tier;
  determining the one or more groups that require a rebalancing of heat scores based on the one or more distribution models; and
  rebalancing the heat scores associated with the one or more heat extents associated with the one or more determined groups to conform to the one or more distribution models.

23. The system of claim 16, wherein the cache engine performs further actions, including:
  modifying the one or more heat scores associated with the one or more heat extents based on the one or more activities and one or more distribution models, wherein the modification includes increasing the one or more heat scores to conform the one or more heat extents with the one or more distribution models;
  associating one or more blocks with the file storage tier that are associated with heat scores that exceed a threshold value provided by the one or more distribution models; and
  copying contents of the one or more associated blocks to the cache storage tier.

24. A network computer for managing data in a file system, comprising:
  a transceiver that communicates over the network;
  a memory that stores at least instructions; and
  one or more processors that execute instructions that perform actions, including:
    instantiating a file system engine to perform actions including:
      providing a file system that includes a plurality of blocks on a file storage tier, wherein a portion of the plurality of blocks are associated with a cache storage tier; and
    instantiating a cache engine that performs actions, including:
      providing one or more heat extents that include a heat score and a run length value, wherein the one or more heat extents are stateful representations of one or more activities associated with one or more of the plurality blocks;
      monitoring the one or more activities associated with the one or more blocks;
      determining the one or more heat extents associated with the one or more activities based on a position of the one or more blocks, wherein the position corresponds with the run length values of the one or more heat extents and one or more sectors on the file storage tier that are associated with the one or more blocks;
      modifying the one or more heat scores associated with the one or more heat extents based on the one or more activities and one or more distribution models, wherein the modification includes decreasing the one or more heat scores to conform the one or more heat extents with the one or more distribution models, and wherein the modification improves efficiency and performance of the one or more processors by reducing consumption of computing resources;
      employing the one or more distribution models to provide different groups of summaries of the one or more heat extents based on a time period assigned for checking distribution of the one or more activities associated with the plurality of blocks, wherein a summary group of active heat extents is assigned a shortest time period for checking distribution and a summary group of dormant heat extents is assigned a longest time period for checking distribution; and
      disassociating the one or more blocks from the cache storage tier that are associated with heat scores that are less than a threshold value provided by the one or more distribution models.

25. The network computer of claim 24, wherein the cache engine performs further actions comprising:
- associating the one or more heat extents with one or more groups based on a position of the one or more blocks on the file storage tier;
- providing summary information associated with the one or more groups; and
- determining the one or more heat extents for modification based on the summary information.

26. The network computer of claim 24, wherein the cache engine performs further actions comprising:
- determining one or more adjacent heat extents;
- determining two or more combinable heat extents of the one or more adjacent heat extents, wherein the two or more combinable heat extents have a same heat score, and wherein a sum of the run length values for the two or more combinable heat extents are less than a heat extent threshold value; and
- combining the two or more combinable heat extents.

27. The network computer of claim 24, wherein monitoring the one or more activities further comprises:
- in response to an activity being a write activity, performing further actions, including:
  - determining a first heat extent that is associated with the one or more blocks associated with the write activity based on a starting position of the write activity and the run length value of the one or more heat extents;
  - truncating the run length of the first heat extent based on the starting position of the write activity; and
  - providing a second heat extent that is associated with the one or more blocks associated with the write activity, wherein a run length of the second heat extent is based on a remainder of the run length of the first extent and a run length threshold value.

28. The network computer of claim 24, wherein providing the one or more heat extents, further comprises, determining a location of the one or more blocks associated with the one or more heat extents based on a location attribute that is included in the one or more heat extents, wherein the location is one of the cache storage tier or the file storage tier.

29. The network computer of claim 24, wherein the cache engine performs further actions, including, determining a number of blocks associated with each heat extent based on the run length value associated with each heat extent, wherein, the number of blocks associated with each heat extent corresponds with its run length value.

30. The network computer of claim 24, wherein the cache engine performs further actions, including:
- associating the one or more heat extents with the one or more groups based on the position of the one or more blocks on the file storage tier;
- determining the one or more groups that require a rebalancing of heat scores based on the one or more distribution models; and
- rebalancing the heat scores associated with the one or more heat extents associated with the one or more determined groups to conform to the one or more distribution models.

* * * * *